Oct. 17, 1950     W. L. VINSON     2,526,099
TEMPERATURE AND FLOW REGULATOR
Filed April 28, 1947     5 Sheets-Sheet 1
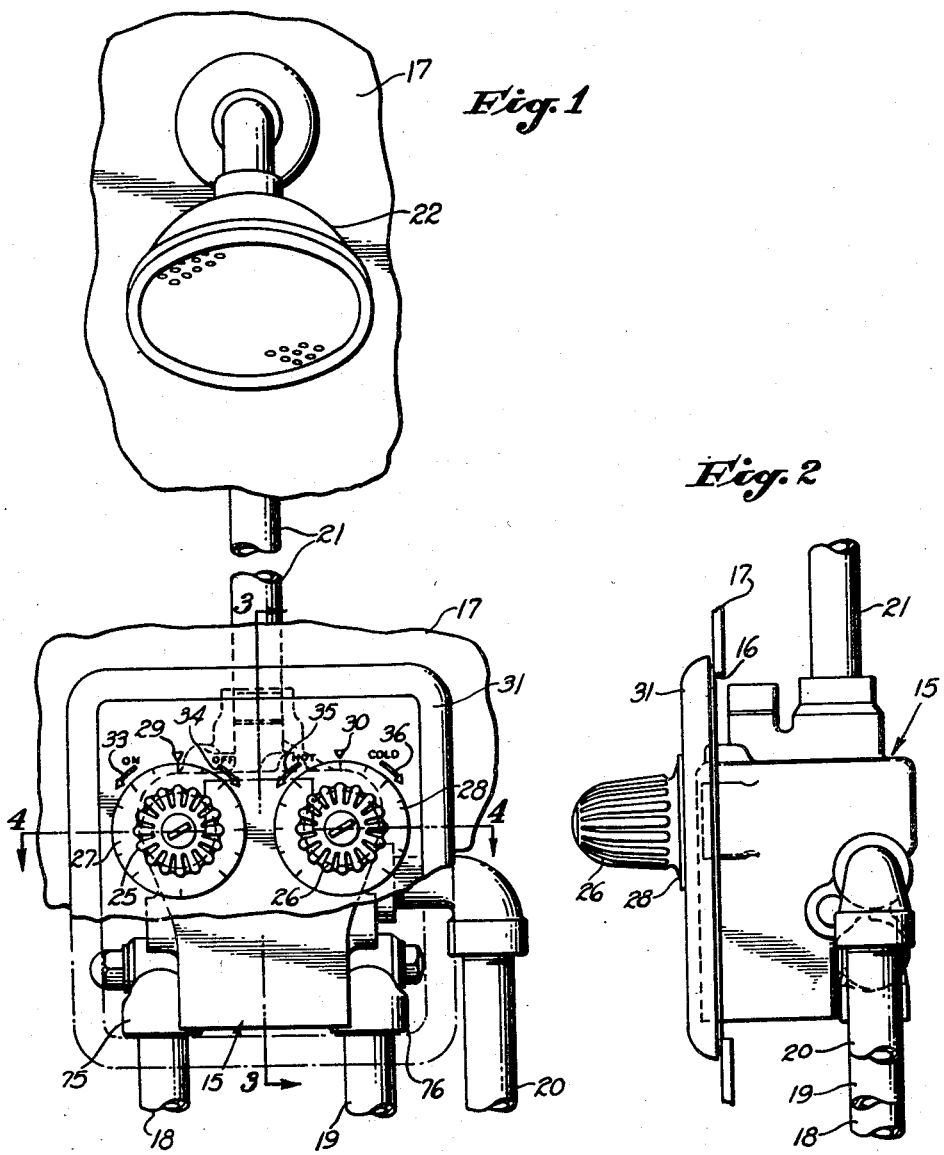
INVENTOR:
WALTER L. VINSON
BY HIS ATTORNEYS
HARRIS, KIECH, FOSTER & HARRIS

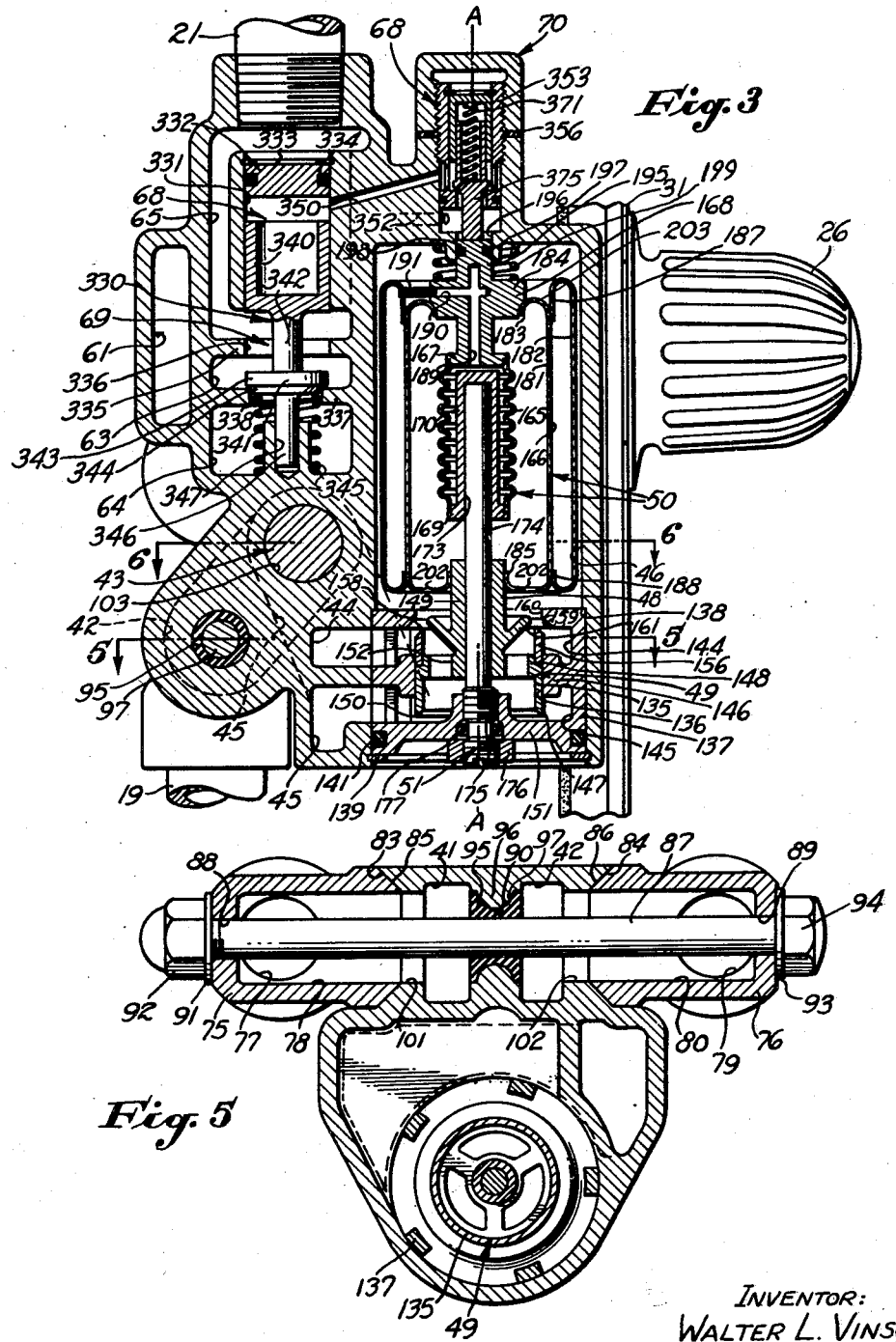

Oct. 17, 1950 W. L. VINSON 2,526,099
TEMPERATURE AND FLOW REGULATOR
Filed April 28, 1947 5 Sheets-Sheet 3
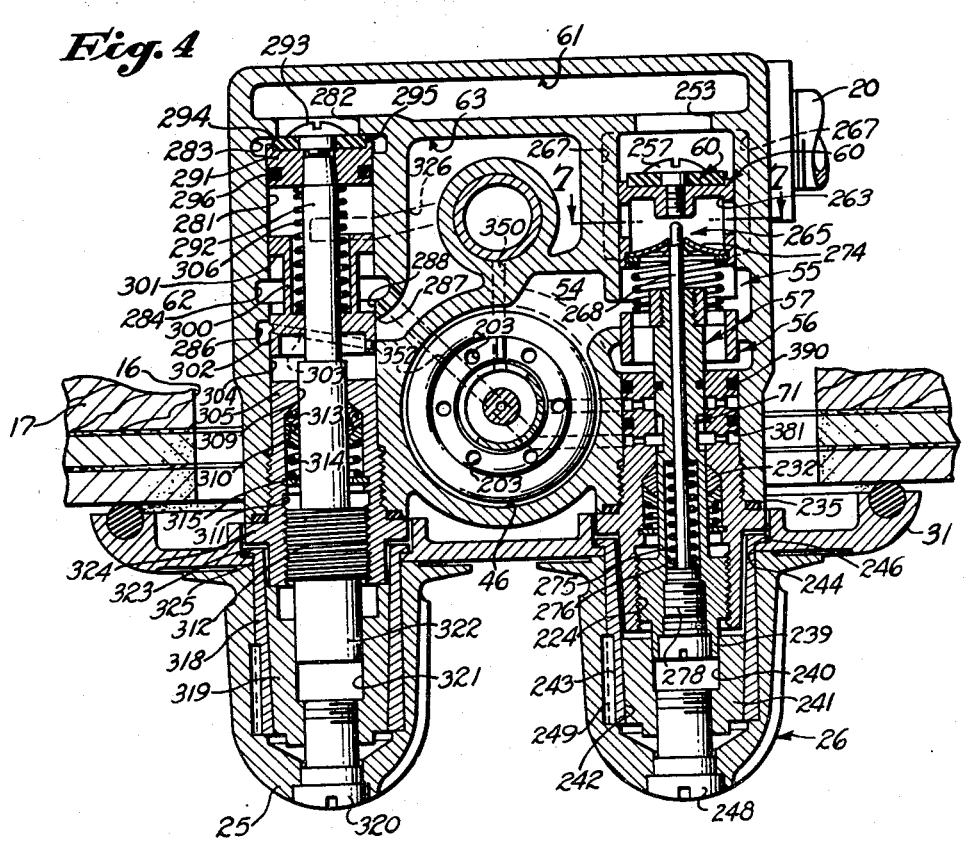
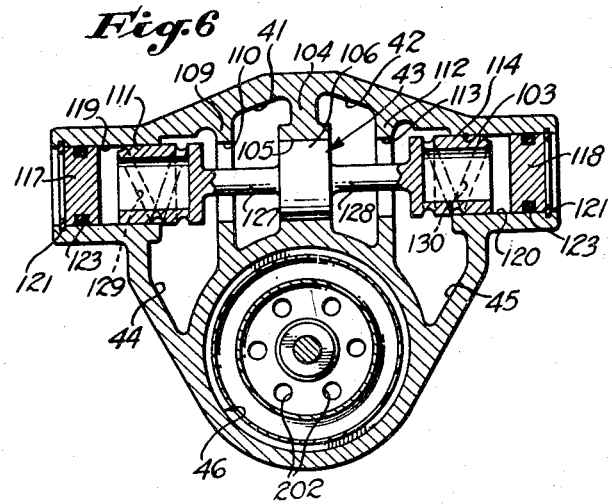
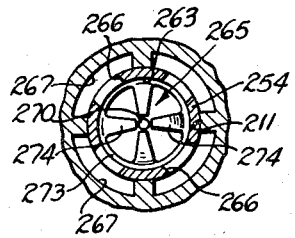
INVENTOR:
WALTER L. VINSON
BY HIS ATTORNEYS
HARRIS, KIECH, FOSTER & HARRIS

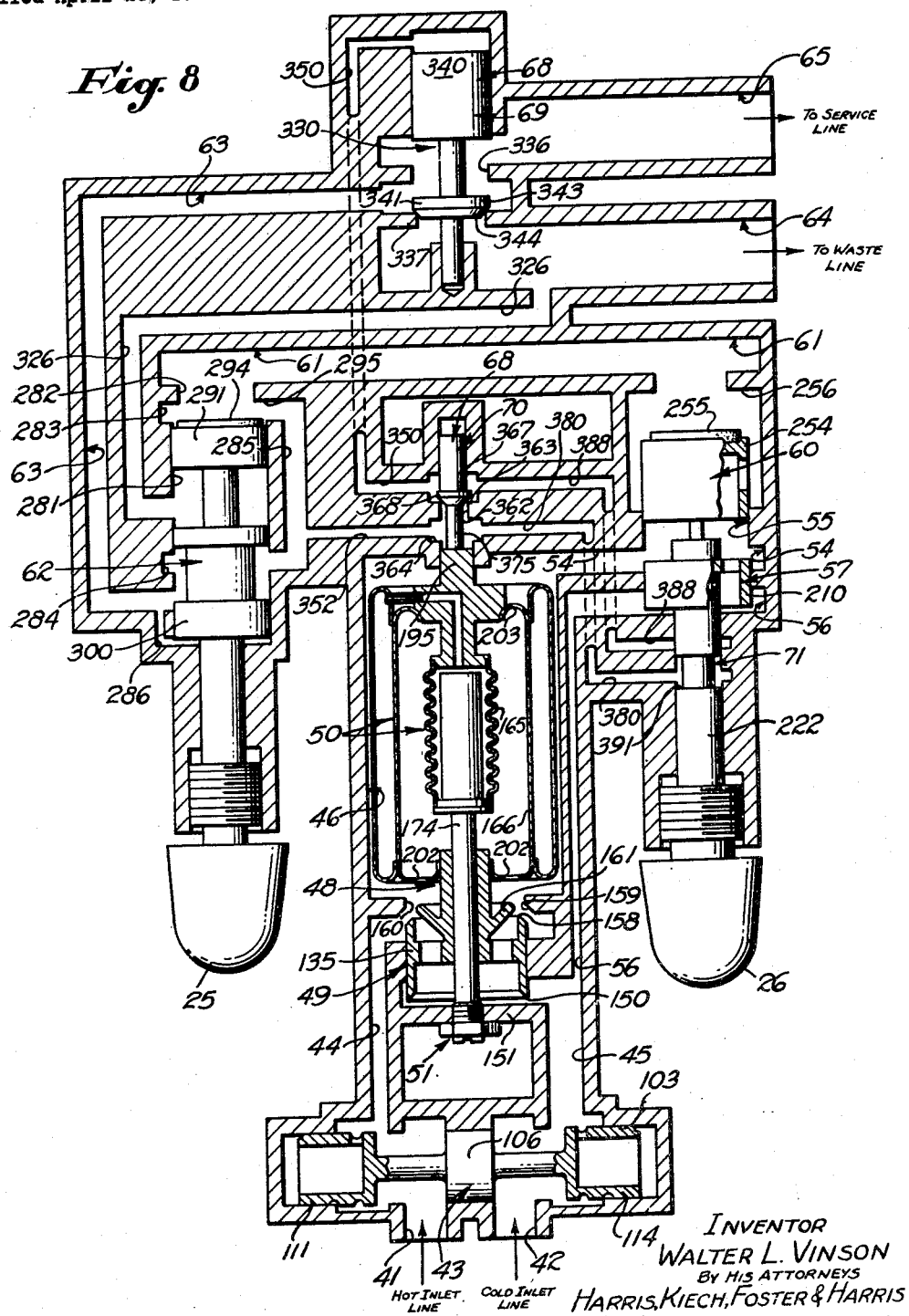

Oct. 17, 1950 W. L. VINSON 2,526,099
TEMPERATURE AND FLOW REGULATOR
Filed April 28, 1947 5 Sheets-Sheet 5
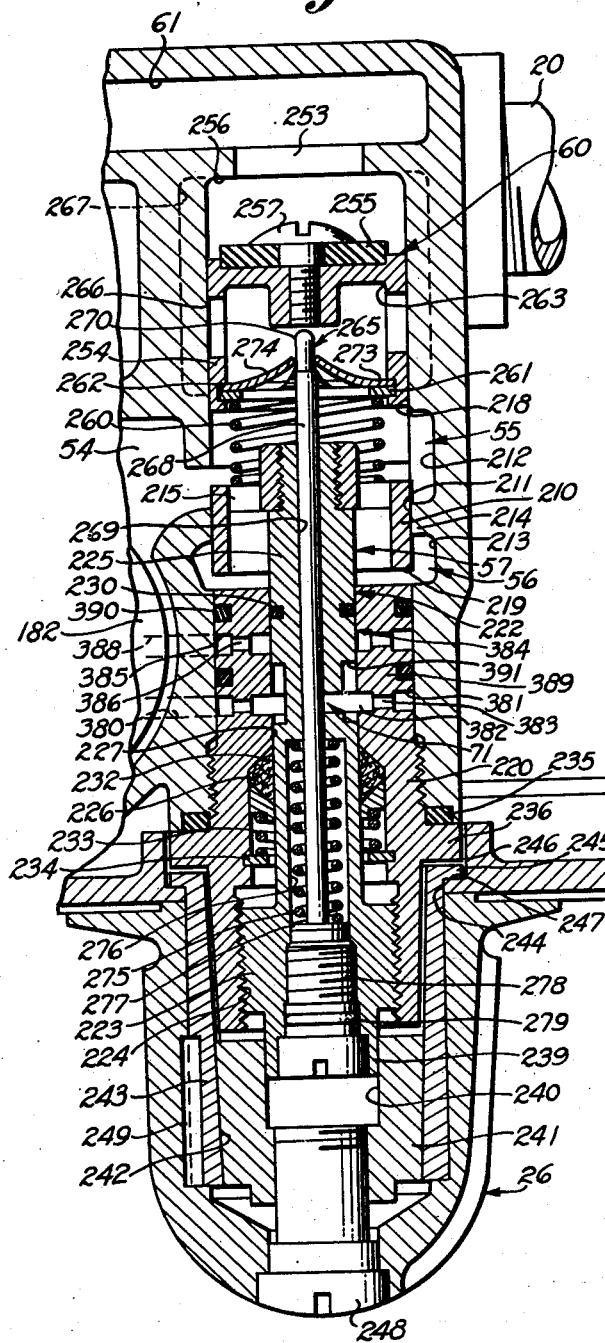
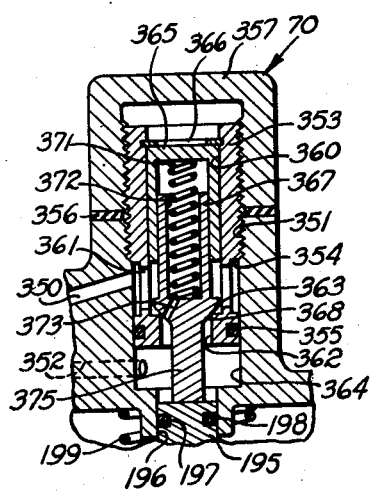
INVENTOR:
WALTER L. VINSON
BY HIS ATTORNEYS
HARRIS, KIECH, FOSTER & HARRIS Patented Oct. 17, 1950

2,526,099

UNITED STATES PATENT OFFICE 2,526,099

TEMPERATURE AND FLOW REGULATOR

Walter L. Vinson, Sherman Oaks, Calif.

Application April 28, 1947, Serial No. 744,395

9 Claims. (Cl. 236—12)

My invention relates in general to fluid temperature and flow regulating devices and, more particularly, to a device for mixing fluids of different temperatures and for delivering the resulting mixture at various selected rates and temperatures as desired by the operator of the device.

This application contains subject matter which is disclosed and claimed in one or more of my co-pending applications entitled: "Device for Regulating Fluid Temperatures," Serial No. 677,-243, filed June 17, 1946; "Fluid Temperature Regulator," Serial No. 677,244, filed June 17, 1946, now abandoned; and "Flow Control Device," Serial No. 707,677, filed November 4, 1946, reference to which is hereby made.

Since the fundamental principles of my invention were originally embodied in a device for delivering water to a shower head at selected rates and temperatures in accordance with the wishes of an individual desiring to take a shower, I prefer to consider such an embodiment herein for convenience in disclosing the invention. However, since this embodiment may be employed for other purposes, and since my disclosure will enable those skilled in the art to practice the invention in other forms, it will be understood that I do not intend to be limited to the specific embodiment and application of my invention which are disclosed herein except insofar as may be required by the claims appended hereto.

In general, a primary object of the invention is to provide a device of the foregoing general character which is adapted to mix hot and cold water, or other fluids of different temperatures, from any suitable sources of supply in such proportions as to maintain the temperature of the resulting mixture substantially constant at a predetermined value regardless of normal temperature variations at the sources of supply, and which is adapted to deliver the mixture at a substantially constant rate regardless of normal pressure variations in the system. A related object is to provide a device of this nature which permits varying the mixture temperature and flow rate as required so that any desired temperature and flow rate within the capacities of the sources of supply may be selected.

It is a specific object of my invention to provide a flow and temperature regulating device which, when incorporated in a shower installation utilizing hot and cold water from conventional sources, is adapted to deliver water to the shower head at selected, substantially constant temperatures ranging from the temperature of the cold water source to a maximum value, which may be the temperature of the hot water source, for example, regardless of normal temperature variations at the hot and cold water sources, and which is adapted to deliver water to the shower head at selected, substantially constant flow rates ranging from zero to a maximum rate corresponding to the pressures available at the sources of supply.

Another object of my invention is to provide a regulating device which admits the fluids of different temperatures at relative rates such that the temperature of this mixture resulting from commingling of the fluids is maintained substantially constant at a predetermined, maximum value, an important object in this connection being to provide a device by means of which additional fluid of the lower temperature may be added to the mixture of maximum temperature manually, whereby the temperature of the final mixture delivered by the device may be reduced below the maximum temperature of the initial mixture in accordance with the wishes of any particular individual. A further object in this connection is to provide a device whereby the initial mixture and the colder fluid may be mixed in varying proportions so that the temperature of the fluid delivered by the device may be varied from the temperature of the colder fluid to that of the initial mixture.

More specifically, it is an object of the invention to provide a regulating device which includes inlet control means responsive to the temperature of the initial mixture of the fluids for regulating the relative rates of flow of the fluids through inlet passages in the device so as to maintain the temperature of the initial mixture substantially constant at a predetermined maximum value, and which includes manually operable means associated with an outlet passage in the device for introducing into the outlet passage an additional quantity of the fluid of lower temperature so as to reduce the temperature of the initial mixture produced by the inlet control means from the maximum value, thereby producing a final mixture of the desired temperature.

Since the final mixture is controlled manually by reducing the constant, maximum temperature of the initial mixture through the addition of fluid of the lower temperature, the only function of the inlet control means is to compensate for any variations in the temperatures of the fluids entering the device, whereby it maintains the temperature of the initial mixture more nearly constant at the maximum value. Thus, the operation of the inlet control means is not influenced by changes in the final mixture temperature since such changes may be made manually without changing the maximum temperature at which the initial mixture is maintained. As a result, the temperature of the major portion of the mass of the structure of the device is maintained substantially constant regardless of changes in the final mixture temperature. Consequently, since the device operates under conditions of approximate equilibrium insofar as the temperature of the structure thereof is concerned, adjustments of the device to produce changes in the final mixture temperature meet with accurate and substantially instantaneous response, which is an important feature of the invention.

An important object of my invention is to provide a device of the character described including flow control means responsive to any pressure variations for maintaining the rate of flow of the final mixture from the device substantially constant at a predetermined value. A related object is to provide a device wherein the flow control means is adjustable to change the rate of flow of the final mixture in accordance with the wishes of the particular individual using the device.

A further object of the invention is to provide a regulating device which includes means for equalizing the pressures of the fluids entering the device so that the inlet control means regulating the relative rates of flow through the inlet passages may operate on fluids of equal pressures. This construction avoids requiring the inlet control means to compensate for pressure fluctuations at the sources of supply so that it will maintain the initial mixture temperature more nearly constant at the desired maximum value, which is an important feature of the invention. Another object in this connection is to provide a pressure equalizing device which is hydraulically balanced in all directions for more sensitive operation.

Still another object is to provide a device of the foregoing general character which includes outlet control means responsive to the temperature of the initial mixture for delivering the final mixture to a by-pass outlet until the initial mixture is at a temperature differing from the maximum value by a predetermined, small amount, and for subsequently delivering the final mixture to a service outlet, whereby the final mixture is not delivered to the service outlet until it approaches the temperature selected by the operator. In a shower installation incorporating my regulating device, the by-pass outlet may lead to a suitable drain, and the service outlet leads to the shower head.

A further object in connection with the foregoing is to provide means for automatically draining the service outlet when the device begins to cool after use so that the operating cycle of the outlet control means is repeated during subsequent use.

An additional object of my invention is to provide the regulating device with manually operable means for causing the outlet control means to close the by-pass outlet and open the service outlet independently of the temperature of the initial mixture so that the final mixture delivered to the service outlet may be at the temperature of the colder fluid entering the device, if desired. Thus, when my regulating device is incorporated in a shower installation, if a cold shower is desired, the outlet control means may be actuated manually to deliver cold water to the shower head through the service outlet regardless of whether the initial mixture temperature is up to the predetermined maximum value. Consequently, the regulating device may be used for supplying cold water in a shower installation without any necessity for having any hot water enter the device, which is another important feature of the invention.

Another object in connection with the foregoing is to provide a regulator having a single knob or other control member for governing the temperature of the final mixture, and for causing the outlet control means to open the service outlet and close the by-pass outlet independently of the initial mixture temperature when the temperature of the final mixture is set for a value close to that of the colder fluid. Preferably, by moving the temperature control knob throughout its range of travel, the temperature of the final mixture delivered to the service outlet is varied between the temperature of the colder fluid entering the device and the predetermined, maximum temperature of the initial mixture, and by moving the temperature control knob to a position at one end of its range of travel wherein the temperature of the final mixture delivered to the service outlet is equal to, or substantially equal to that of the colder fluid, the outlet control means is actuated to open the service outlet and close the by-pass outlet independently of the temperature of the initial mixture so that the colder fluid only may be delivered to the service outlet, if desired.

An important object of my invention is to provide a regulating device of the character described which includes means responsive to temperature for interrupting flow through the device in the event that the temperature of the final mixture flowing through the outlet passage exceeds a specified value, this value preferably being a few degrees higher than the specified maximum temperature of the initial mixture. A related object is to provide flow interrupting means which responds to excessive fluid temperatures substantially instantaneously to interrupt flow through the device, the flow preferably being interrupted before any of the fluid at an excessively high temperature reaches the end of a service line connected to the service outlet of the device. Thus, in the event of any failure or malfunctioning of any component of my regulating device which would result in delivery to the service outlet of fluid at an excessively high temperature, the flow interrupting means terminates all flow through the device, which is an important feature of my invention particularly when incorporated in a shower installation.

I contemplate a temperature and flow regulating device wherein the inlet control means includes thermostatically operated valve means for mixing the fluids of different temperatures, an important object in this connection being to provide a mixing valve means which is adapted to produce relatively thin, annular streams of the fluids which intersect in such a manner as to insure thorough mixing. Another object in this connection is to provide a regulating device wherein the annular streams produced by the mixing valve means are of a generally conical shape and are symmetrical about a common axis, one of these streams being convergent and the other divergent to insure thorough mixing of the fluids.

The mixing valve means is preferably operated by thermostatic means which is exposed to the initial mixture and which includes a pair of interconnected reservoirs filled with an operating fluid which is adapted to expand and contract in response to temperature variations, one of the reservoirs being rigid and the other being expansible and contractible. This construction permits the use of a larger body of operating fluid than would otherwise be possible so that the volume changes of the operating fluid for given temperature changes are increased, thus increasing or amplifying the amount of expansion or contraction of the expansible reservoir for a given temperature change, which is an important feature of the invention.

One of the objects of my invention in connection with the thermostatic means is to provide a construction wherein the rigid reservoir is of tubular form and surrounds the expansible and contractible reservoir so that the initial mixture to which the thermostatic means is exposed may flow in an annular passage between the two reservoirs, or may flow in another annular passage between the rigid reservoir and the wall of a mixing chamber in which the thermostatic means is disposed. Another and important object in this connection is to distribute the flow through these annular passages in such a manner as to obtain substantially uniform heat exchange between the initial mixture and all portions of the temperature sensitive operating fluid in the reservoirs.

Still another object in connection with the thermostatic means is to provide a construction wherein the reservoirs are initially filled with operating fluid while the fluid is at a temperature slightly less than the desired maximum temperature of the initial mixture and while the expansible and contractible reservoir is compressed to substantially its minimum length. By filling the reservoirs under such conditions, the expansible reservoir will remain contracted to its minimum length as long as the temperature of the operating fluid is at or below the temperature provided during the initial filling operation, and will not begin to expand until the initial mixture temperature exceeds the temperature at which the reservoirs were filled. The foregoing provides for maximum flow of the hotter fluid until the initial mixture temperature approaches its predetermined maximum value so that the maximum temperature of the initial mixture is more rapidly attained, which is an important feature of the invention.

Another object is to provide means for adjusting the thermostatic means so as to vary the maximum temperature at which the initial mixture is maintained, such adjusting means preferably being set semi-permanently when the regulating device is manufactured or installed to prevent tampering with the setting by unauthorized persons.

Other objects of my invention include the provision of a temperature and flow regulating device which is compact, which may be formed of parts that are simple to manufacture and assemble, and which may be manufactured to sell at a relatively low price.

The foregoing objects and advantages of my invention, together with various other objects and advantages which will be evident hereinafter, may be realized by means of the exemplary embodiment which is illustrated in the accompanying drawings and which is described in detail hereinafter. Referring to the drawings:

Fig. 1 is a fragmentary, front elevational view on a reduced scale of a shower installation incorporating a fluid temperature and flow regulator which embodies the fundamental principles of my invention;

Fig. 2 is a side elevational view of the regulator on a reduced scale;

Figs. 3 and 4 are sectional views which are taken along the broken lines 3—3 and 4—4, respectively, of Fig. 1;

Figs. 5 and 6 are sectional views which are taken along the broken lines 5—5 and 6—6, respectively, of Fig. 3;

Fig. 7 is a fragmentary sectional view which is taken along the broken line 7—7 of Fig. 4;

Fig. 8 is a diagrammatic view showing the flow through the regulating device;

Fig. 9 is a fragmentary sectional view duplicating the right one-half of Fig. 4 on an enlarged scale; and Fig. 10 is a fragmentary sectional view duplicating a portion of Fig. 3 on an enlarged scale.

For convenience in disclosing the invention, I prefer to consider a specific embodiment thereof in connection with a shower installation with the knowledge that my disclosure will enable those skilled in the art to employ the specific embodiment disclosed herein for other purposes and to devise other embodiments. Consequently, it will be understood that I do not intend to be limited to the specific embodiment and application of my invention which are disclosed herein for purposes of illustration.

Referring particularly to Figs. 1 and 2 of the drawings, my temperature and flow regulator is indicated generally by the numeral 15 and is shown mounted in an opening 16 in a wall 17 which, for example, may be a wall of a stall shower (not shown). Inlet lines 18 and 19 for hot and cold water, respectively, are located behind the wall 17 and are connected to the regulator 15 in a manner to be described in detail hereinafter, the inlet lines being connected to suitable sources of supply (not shown). A by-pass or waste line 20 is connected to the regulator 15 and leads to a suitable disposal point such as a sewer line (not shown), for example, the regulator being adapted to discharge the water delivered thereto through the inlet lines 18 and 19 into the waste line 20 under certain operating conditions which will be described hereinafter. A service line 21 is connected to the regulator 15 and leads to a shower head 22, the shower head being mounted on the wall 17 in the conventional manner.

The regulator 15 is provided with control elements 25 and 26 for selecting the rate of flow of water to the shower head 22 and for selecting the temperature of the water to be delivered to the shower head, respectively, the control elements preferably being ribbed knobs, as shown in the drawings, for convenient manipulation by the operator. The control knobs 25 and 26 are rotatable relative to the body of the regulator 15 and are preferably provided with flanges 27 and 28, respectively, having lines or other indicia thereon which may be used in connection with pointers 29 and 30 to obtain various flow rates and temperature settings, respectively, as will be described in more detail hereinafter. The pointers are preferably carried by a panel 31 which covers the opening 16 in the wall 17 to conceal the body of the regulator 15, thereby providing a shower installation having an attractive appearance.

The panel 31 is preferably provided with arrows 33 and 34 thereon adjacent the flow control knob 25 to indicate the direction of rotation required to increase or decrease the rate at which water is delivered by the regulator 15. As will be discussed hereinafter, rotation of the flow control knob 25 in the direction of the arrows 33 and 34 respectively increases and decreases the flow rate, flow through the regulator 15 being terminated upon rotation of the flow control knob to the end of its travel in the direction of the arrow 34. If desired, the words "on" and "off" may be placed on the panel 31 adjacent the arrows 33 and 34, respectively, as shown in Fig. 1 of the drawings, for convenience in varying the flow rate.

Similarly, the panel 31 is provided with arrows 35 and 36 thereon adjacent the temperature control knob 26 which respectively indicate the directions of rotation required to increase and decrease the temperature of the water delivered by the regulator 15. If desired, the words "hot" and "cold" may be placed on the panel 31 adjacent the arrows 35 and 36, respectively, so that the operator may readily ascertain the direction of rotation of the temperature control knob 26 which is required to increase or decrease the temperature of the water delivered by the regulator.

It will be apparent from the preceding discussion that the operator of my temperature and flow regulating device may select temperatures and flow rates through the manipulation of only two control elements, rotation of the control knob 25 serving to vary the flow rate, and rotation of the knob 26 serving to vary the temperature. The manner in which rotation of the control knobs 25 and 26 produces such flow rate and temperature variations will be explained in detail hereinafter.

The general construction and operation of the temperature and flow regulator 15 will now be considered with particular reference to Fig. 8, wherein the regulator is shown semi-diagrammatically. The inlet lines 18 and 19 communicate with inlet passages 41 and 42, respectively, which lead to means 43 for equalizing the pressure of the hot and cold water entering the regulator 15. From the pressure equalizing means 43, the hot water and cold water flow through inlet passages 44 and 45, respectively, into a primary mixing chamber or zone which is indicated generally by the numeral 46. The regulator 15 includes temperature responsive inlet control means 48 for regulating the relative rates of flow of the hot water and the cold water through the inlet passages 44 and 45 in such a manner as to produce in the primary mixing chamber 46 an initial or primary mixture of a substantially constant, maximum temperature. The inlet control means 48 includes primary mixing valve means 49 for governing the relative rates of flow of the hot and cold water into the primary mixing chamber 46, and includes thermostatic means 50 exposed to the initial mixture in the primary mixing chamber for controlling the operation of the primary mixing valve means in such a manner as to maintain the temperature of the initial mixture substantially constant at the predetermined maximum value. The inlet control means 48 also includes means 51 for adjusting the thermostatic means 50 so as to permit varying the predetermined or maximum temperature at which the initial mixture is maintained, the adjusting means 51 preferably being accessible only to service personnel so that persons normally operating the regulator 15 cannot change the setting of the thermostatic means. As will be discussed in more detail hereinafter, when the regulator 15 is incorporated in a shower installation, the thermostatic means 50 is preferably, although not necessarily, adjusted to maintain the temperature of the initial mixture substantially constant at a value corresponding to the temperature of the hottest water that the average person can withstand reasonably comfortably, which temperature is approximately 115° F.

The regulator 15 is provided with an intermediate passage 54 which serves as an outlet for the primary mixing chamber 46 and which leads to a secondary mixing chamber or zone 55, the latter being connected to the inlet passage 45 for cold water by an auxiliary inlet passage 56. Thus, the initial or primary mixture at the maximum temperature may flow into the secondary mixing chamber 55 through the intermediate passage 54, and cold water may flow through the auxiliary inlet passage 56 into the secondary mixing chamber, the relative rates of flow of the initial mixture and of cold water into the secondary mixing chamber being controlled by manually operable, secondary mixing valve means 57. As will be discussed in more detail hereinafter, the secondary mixing valve means 57 is actuated by the temperature control knob 26 so that the person taking a shower may introduce sufficient cold water into the initial mixture to produce a secondary, or final mixture of a temperature less than the maximum value as desired.

In order to eliminate any possibility of scalding the person taking a shower in the event of mal-functioning or failure of the thermostatic means 50, or any other component of the regulator 15, the regulator is preferably provided with means 60 responsive to the temperature of the final mixture for interrupting all flow through the regulator. The flow interrupting means 60, which is preferably located in an outlet passage 61 leading from the secondary mixing chamber 55, is preferably responsive to a final mixture temperature of, for example, 2° F. above the predetermined or maximum temperature of the initial mixture. Thus, if the thermostatic means 50 is set for a temperature of 115° F., for example, as the highest temperature which the average person can withstand reasonably comfortably, the flow interrupting means 60 is preferably responsive to a temperature of 117° F., for example. However, any desired temperature settings for the thermostatic means 50 and the flow interrupting means 60 may be employed and it will be understood that I do not intend to be limited to the specific values mentioned.

The outlet passage 61 in the regulator 15 leads to manually adjustable flow control means 62 for maintaining the rate of flow of the final mixture substantially constant at a predetermined value, the flow control means 62 being responsive to pressure variations in the final mixture as will be discussed in more detail hereinafter. The flow control means 62 is actuable by the flow control knob 25 so that the person taking a shower may select any desired flow rate merely by rotating the knob 25, whereupon the flow control means maintains the selected flow rate substantially constant by responding to pressure variations.

The regulator 15 is provided with an outlet passage 63 which is a continuation of the outlet passage 61 and which leads from the flow control means 62 to branching by-pass and service outlets 64 and 65, respectively, the waste line 20 being connected to the by-pass outlet 64 and the service line 21 leading to the shower head 22 being connected to the service outlet 65. The regulator 15 includes outlet control means 68 associated with the by-pass and service outlets 64 and 65 for delivering the final mixture to the by-pass outlet until the initial mixture reaches, or substantially reaches, the maximum value, and for subsequently delivering the final mixture to the service outlet. The outlet control means 68 includes hydraulically operable outlet valve means 69 for diverting the final mixture either into the by-pass outlet 64, or the service outlet 65, and includes control valve means or pilot valve means 70 for delivering operating fluid, preferably water in the particular construction illustrated, to the hydraulically operable outlet valve means. As will be discussed in more detail hereinafter, the pilot valve means 70 is actuable to deliver operating fluid to the outlet valve means 69 by the thermostatic means 50 when the temperature of the initial mixture reaches, or substantially reaches, the predetermined or maximum value. However, the pilot valve means 70 may be actuated by other thermostatic means if desired.

It will be noted that since the pilot valve means 70 is actuable by the thermostatic means 50 in the particular construction illustrated, the final mixture will not be delivered to the service outlet 65 unless the temperature of the initial mixture in the primary mixing chamber 46 is sufficiently high to actuate the pilot valve means. Consequently, if the regulator 15 is to be used to deliver cold water only to the service outlet 65 for a person desiring a cold shower, it is necessary, under this condition, that the outlet control means 68 be actuable to deliver the cold water to the service outlet independently of the temperature of the initial mixture. Accordingly, I provide means 71 for actuating the outlet valve means 69 independently of the pilot valve means 70 so that operating fluid will be delivered to the outlet valve means 69 even if the temperature of the initial mixture in the primary mixing chamber 46 is not equal to or substantially equal to the maximum value. The actuating means 71 is preferably operatively associated with the secondary mixing valve means 57 and, as will be discussed in more detail hereinafter, is preferably adapted to by-pass the pilot valve means 70 when the temperature control knob 26 has been rotated to the end of its travel in the direction of the arrow 36 (see Fig. 1). When the temperature control knob 26 is in this position, the secondary mixing valve means 57 is preferably in a position such that it prevents, or substantially prevents flow of the initial mixture into the secondary mixing chamber 55 while permitting cold water from the auxiliary inlet passage 56 to flow thereinto. Thus, when the temperature control knob 26 is rotated to the end of its travel in the direction of the arrow 36, the secondary mixing valve means 57 permits cold water only to enter the outlet passage 61 and, at the same time, the actuating means 71 by-passes the pilot valve means 70 to deliver operating fluid to the hydraulically operable outlet valve means 69, whereupon the outlet valve means delivers the cold water to the service outlet 65, and thence to the shower head 22, instead of delivering it to the by-pass outlet 64 as would normally be the case.

With the foregoing general discussion of the construction and operation of the regulating device 15 in mind, the various components of the device will now be considered in more detail. As best shown in Figs. 1 and 5, the inlet lines 18 and 19 for the hot and cold water are threadedly connected to special elbows 75 and 76, respectively, the elbow 75 being provided with intersecting passages 77 and 78 therein and the elbow 76 being provided with similar passages 79 and 80. The body of the regulator 15 is provided with tapered annular seats 83 and 84 for complementarily tapered annular surfaces 85 and 86 on the elbows 75 and 76, respectively, the elbows being secured to the body of the regulator by a bolt 87 which retains the tapered surfaces 85 and 86 on the respective elbows in fluid-tight engagement with the annular seats 83 and 84 in the body of the regulator. It will be noted that the bolt 87 extends through openings 88 and 89 in the elbows 75 and 76, respectively, and through an opening 90 in the body of the regulator 15, the opening 88 being sealed by an annular washer 91 preferably formed of soft metal, which is compressed between the elbow 75 and a nut 92 threaded on the end of the bolt 87, and the opening 89 being sealed by a similar washer 93 which is compressed between the elbow 76 and the head 94 of the bolt. The bolt 87 is sealed with respect to the opening 90 in the body of the regulator 15 by an annular sealing element 95, preferably formed of rubber or a similar material, which encircles the bolt and which is secured with respect to the body of the regulator by an annular rib 96 encircling the opening 90 and extending into a complementary groove 97 in the sealing element.

As best shown in Fig. 5 of the drawings, the passage 78 in the elbow 75 registers with a bore 101 which communicates with the inlet passage 41 leading to the pressure equalizing means 43. Similarly, the passage 80 in the elbow 76 registers with a bore 102 which communicates with the inlet passage 42 leading to the pressure equalizing means. It will be noted that the sealing element 95 which was described in the preceding paragraph separates the inlet passages 41 and 42.

As viewed in Fig. 3, the inlet passages 41 and 42 for the hot and cold water extend upwardly and forwardly toward the pressure equalizing means 43, the latter being disposed in a bore 103 which extends through the body of the regulator 15, as best shown in Fig. 6, and which intersects the inlet passages 41, 42, 44 and 45. The inlet passages 41 and 42 for the hot and cold water are separated by a wall 104 through which the bore 103 extends to provide a cylindrical seat 105 for a piston-like valve element 106 which forms part of the pressure equalizing means 43 as will be discussed in more detail hereinafter. The inlet passages 41 and 44 for the hot water are separated by a wall 109 through which the bore 103 extends to provide a cylindrical seat 110 for a piston-like valve element 111 which also forms part of the pressure equalizing means. Similarly, the bore 103 extends through a wall 112 separating the inlet passages 42 and 45 for the cold water to provide a cylindrical seat 113 for a piston-like valve element 114. The ends of the bore 103 are sealed by heads 117 and 118 which are so positioned with respect to the valve elements 111 and 114, respectively, as to provide a fluid receiving space 119 between the valve element 111 and the head 117, and to provide a similar space 120 between the valve element 114 and the head 118. The heads 117 and 118 are retained in the bore 103 by snap rings 121 located in grooves in the body of the regulator 15, and a fluid-tight seal between the heads and the body of the regulator is provided by sealing rings 122 which are disposed in annular grooves in the heads.

In the particular construction illustrated, the valve elements 106, 111 and 114 are interconnected by rods 127 and 128 formed integrally therewith although the valve elements and rods may be formed separately if desired. Thus, the valve elements 106, 111 and 114 move in unison in the bore 103 to equalize the pressures of the hot and the cold water as will be discussed in more detail in the next paragraph. The valve element 111 is provided with a spiral groove 129 therein which leads from the inlet passage 44 for the hot water to the space 119 between the valve element 111 and the head 117. Similarly, the valve element 114 is provided with a spiral groove 130 therein which provides fluid communication between the inlet passage 45 for the cold water and the space 120 between the valve element 114 and the head 118. The use of the spiral grooves 129 and 130 providing fluid communication between the inlet passages 44 and 45 and the spaces 119 and 120, respectively, insures that the valve elements 111 and 114 will be substantially balanced hydraulically insofar as pressure forces transversely of the bore 103 are concerned so that there is substantially no tendency for the valve elements to bind in the bore.

It will readily be apparent that since the spiral groove 129 connects the inlet passage 44 to the space 119, the pressure of the hot water in the inlet passage 44 is communicated to the outer end of the valve element 111. Similarly, the pressure of the cold water in the inlet passage 45 is communicated to the outer end of the valve element 114. Consequently, if the pressures of the hot water and the cold water differ, the pressure equalizing means 43 will be unbalanced and will move in the bore 103 in the direction of the net pressure force. Thus, if the pressure of the cold water exceeds that of the hot water, for example, the pressure equalizing means 43 will tend to move toward the left, as viewed in Fig. 6, whereby the valve element 111 moves away from its seat 110 to decrease the resistance to flow of the hot water from the inlet passage 41 to the inlet passage 44, and, at the same time, the valve element 114 moves toward its seat 113 to increase the resistance to flow of the cold water from the inlet passage 42 to the inlet passage 45. Such movement of the pressure equalizing means 43 toward the left, as viewed in Fig. 6, continues until the resistances to flow of the hot water and cold water have been decreased and increased, respectively, to such extents that the pressures of the hot and cold water in the respective inlet passages 44 and 45 are substantially equal. Thus, the pressure equalizing means 43 continuously hunts a position such that the pressures of the hot water and the cold water in the inlet passages 44 and 45 leading to the inlet control means 48 are always substantially equalized. Moreover, if the flow of cold water in the inlet passage 42 should be interrupted for any reason, the pressure of the hot water would displace the pressure equalizing means 43 to the right, as viewed in Fig. 6, a sufficient distance to seat the valve element 111 so as to shut off the flow of hot water also. Thus, the pressure equalizing means 43 eliminates any possibility of scalding the person taking a shower in the event of failure of the cold water supply, which is an important feature of the invention. It will be apparent that the pressure equalizing means will also operate to terminate flow of cold water in the event of any interruption in the flow of hot water in a similar manner.

As previously discussed, the inlet passages 44 and 45 convey the hot water and the cold water, respectively, from the pressure equalizing means 43 to the primary mixing chamber 46, the inlet control means 48 being adapted to regulate the relative rates of flow of the hot and cold water into the primary mixing chamber in such a manner as to produce an initial or primary mixture of a substantially constant, maximum temperature. As best shown in Fig. 3, the primary mixing valve means 49, which forms part of the inlet control means 48, includes a mixing valve 135 which is slidable in a bore 136 in an insert member 137, the insert member being disposed in one end of the primary mixing chamber 46 and being seated against a shoulder 138 formed therein. The insert member 137 is retained in the primary mixing chamber 46 by a snap ring 139 which is disposed in an annular groove in the body of the regulator 15, a fluid-tight seal between the insert member and the body of the regulator being provided by an annular sealing element 141 which is disposed in a complementary groove in the insert member.

As best shown in Fig. 3, the insert member 137 is provided with annular inlet passages 144 and 145 therein which encircle the mixing valve 135 and which are separated from each other by a partition or wall 146. The inlet passage 144 in the insert member 137 communicates with the inlet passage 44 for hot water in the body of the regulator 15, and the inlet passage 145 in the insert member communicates with the inlet passage 45 for cold water.

The mixing valve 135 includes a generally cup-shaped element 147 which includes a base wall 148 having a tubular stem 149 extending therefrom, the cup-shaped element being provided with a tapered edge or rim 150 which is adapted to seat against the base wall 151 of the bore 136 in the insert member 137 to prevent the flow of cold water from the annular inlet passage 145 into the interior of the mixing valve. The base wall 148 of the cup-shaped element 147 is provided with a plurality of openings 152 therethrough to permit the flow of cold water entering the interior of the mixing valve 135 into the upper portion thereof, as viewed in Fig. 3.

The mixing valve 135 also includes an annular collar 156 which is seated in a complementary recess in the cup-shaped element 147, the annular collar being soldered or otherwise secured to the cup-shaped element of the mixing valve. The annular collar 156 is provided with a tapered edge or rim 158 which is adapted to enter the mouth 160 of the bore 136 in the insert member 137 to prevent the flow of hot water from the annular inlet passage 144 into the upper portion of the primary mixing chamber 46, as viewed in Fig. 3, the mouth 160 having a tapered, annular entering surface 159. It will be noted that when the tapered rim 158 of the collar 156 is spaced from the tapered annular surface 159, the hot water flowing from the annular inlet passage 144 into the primary mixing chamber 46 will be discharged into the primary mixing chamber in the form of a relatively thin, convergent annular stream of generally conical shape, this stream being symmetrical about the axis A—A of the primary mixing chamber. The cold water flowing into the primary mixing chamber 46 from the interior of the mixing valve 45 is deflected by a generally conical flange 161 on the stem 149 of the cup-shaped element 147 to produce a generally conical, annular stream which is similar to the stream of hot water discharged into the primary mixing chamber except that it is divergent instead of convergent. Thus, the streams of hot and cold water discharged into the primary mixing chamber 46 intersect to insure thorough and almost instantaneous mixing, the angle of intersection of the two annular streams preferably being of the approximate order of magnitude of 90° as illustrated in Fig. 3 of the drawings.

It will thus be apparent that the primary mixing valve means 49 controls the relative rates of flow of the hot and cold water into the primary mixing chamber 46 and mixes the hot and cold water thoroughly to produce the previously discussed initial or primary mixture. As will be discussed in detail in the following paragraphs the thermostatic means 50 is exposed to this initial mixture and varies the position of the mixing valve 135 in its bore 136 in such a manner as to maintain the temperature of the initial mixture substantially constant at the specified maximum value.

As best shown in Fig. 3, the thermostatic means 50 includes an expansible and contractible primary reservoir 165, which is preferably in the form of a bellows, and includes a rigid, secondary reservoir 166 of generally tubular form which encircles the bellows and is spaced therefrom, the secondary reservoir also being spaced from the peripheral wall of the primary mixing chamber 46. As will be discussed in more detail hereinafter, the initial mixture may flow upwardly, as viewed in Fig. 3, between the bellows 165 and the secondary reservoir 166, and between the secondary reservoir and the wall of the primary mixing chamber.

Considering the structure of the thermostatic means 50 in more detail, one end of the bellows 165 is soldered or otherwise secured to a flange 167 on a head member 168, the other end of the bellows being secured to a flange 169 on a tubular stop member 170 which extends upwardly, as viewed in Fig. 3, into the bellows. The stop member 170 is provided with a bore 173 therein for a rod 174 which forms part of the thermostat adjusting means 51, the adjusting rod being threaded in a bore 175 in the insert member 137. The adjusting rod 174 may be locked in any desired position by means of a nut 176 which is threaded thereon and which seats against the exterior face of the insert member 137. Leakage between the adjusting rod 174 and the insert member is prevented by a sealing ring 177 which is disposed in an annular recess in the insert member.

The secondary reservoir 166 is preferably formed of two concentric tubes 181 and 182 which are preferably formed of copper or other material having a high co-efficient of heat conductivity. The inner tube 181 is provided with an inwardly rolled end 183 which is soldered or otherwise secured to an annular flange 184 on the head member 168, and is provided with an inwardly rolled end 185 which is secured to the tubular stem 149 of the mixing valve 135. Similarly, the outer tube 182 is provided with inwardly rolled ends 187 and 188 which are suitably secured to the inner tube 181 to provide the secondary reservoir 166. Fluid communication between the bellows 165 and secondary reservoir 166 is provided by passages 189 and 190 in the head member 168 and by a tube 191, this tube communicating with the secondary reservoir and with the bore 190, and the bore 189 communicating with the bellows.

It will be noted that the mixing valve 135, the secondary reservoir 166 and the head member 168 are all rigidly connected and are movable in unison axially of the primary mixing chamber 46, the bore 136 in the insert member 137 serving as a guide. The head member 168 is provided with a cylindrical projection 195 which is slidable in a bore 196 in the body of the regulator 15 to provide an additional guide for such axial movement of the mixing valve 135, the secondary reservoir 166 and the head member 168. As will be discussed in more detail hereinafter, the projection 195 is also adapted to actuate the pilot valve means 70, leakage past this projection being prevented by a sealing ring 197 which is disposed in an annular groove 198. It will be noted that the mixing valve 135 is normally urged downwardly, as viewed in Fig. 3, by a spring 199 which tends to prevent the flow of cold water from the annular inlet passage 145 into the interior of the mixing valve by seating the tapered rim 150 of the mixing valve against the wall 151 of the insert member 137, the spring being disposed between the flange 184 on the head member 168 and the end wall of the primary mixing chamber 46.

In order to permit the initial mixture discharged into the primary mixing chamber 46 through the mixing valve means 49 to pass upwardly in the primary mixing chamber between the bellows 165 and the secondary reservoir 166 as previously mentioned, the inwardly rolled end 185 of the inner tube 181 forming part of the secondary reservoir is provided with a plurality of openings 202 therein, as best shown in Figs. 3 and 6. Similarly, the inwardly rolled end 183 of the tube 181 is provided with a plurality of openings 203 therein, as shown in Figs. 3 and 4.

As will be discussed in more detail hereinafter, the bellows 165 and the reservoir 166 are filled with an operating fluid which is adapted to expand and contract in response to increases and decreases, respectively, in the temperature of the initial mixture in the primary mixing chamber 46. Since the exterior surface area of the reservoir 166 is larger than the interior surface area of the inner tube 181, and since the wall of the primary mixing chamber is also a heat exchanging surface, the dimensions of the openings 202 and 203 which permit the initial mixture to flow between the bellows and the reservoir are preferably such that only a relatively small portion of the initial mixture may flow through the space between the bellows and the secondary reservoir, whereby the major portion of the initial mixture flows through the space between the secondary reservoir and the peripheral wall of the primary mixing chamber 46. The distribution of the flow of the initial mixture past the bellows 165 and the secondary reservoir is preferably such that the relative rates of flow through the space between the bellows and the secondary reservoir 166 and through the space between the secondary reservoir and the peripheral wall of the primary mixing chamber 46 are approximately proportional to the relative surface areas of the bellows plus the area of the inside of the tube 181 and the exterior of the tube 182 plus the area of the wall of the primary mixing chamber 46 so as to produce a more uniform heat exchange between the initial mixture and the operating fluid. In other words, such a flow distribution causes the temperature of the operating fluid to change at substantially the same rate at all points in the bellows 165 and the secondary reservoir 166 in the event of a temperature change in the initial mixture to provide a more uniform response, which is an important feature of the invention.

Before discussing the remainder of the structure of the regulating device 15 in detail, the operation of the thermostatic means 50 will now be considered for convenience. As previously discussed, the spring 199 tends to seat the tapered rim 150 of the mixing valve 135 so as to prevent flow of cold water into the primary mixing chamber 46 from the annular inlet passage 145. At the same time, the spacing between the rim 158 of the mixing valve and the annular surface 159 encircling the mouth 160 of the bore 136 is a maximum so that hot water from the annular inlet passage 144 may flow into the primary mixing chamber 46 at a maximum rate. The mixing valve 135 remains in this position until the temperature of the operating fluid in the bellows 165 and the secondary reservoir 166 has been elevated sufficiently by the hot water entering the primary mixing chamber 46 to begin expanding the bellows. If the regulator 15 has not been in use for some time, the water in the inlet line 18 leading to the source of hot water supply may have cooled off so that expansion of the bellows 165 will not begin until such cooled water has all been displaced by hot water from the source of supply.

After the temperature of the water entering the primary mixing chamber 46 has increased sufficiently to expand the operating fluid in the bellows 165 and the reservoir 166 a predetermined amount, the bellows begins to expand downwardly, as viewed in Fig. 3, and, as the bellows continues to expand, the stop member 170 seats on the upper end of the adjusting rod 174. The adjusting rod 174 prevents further downward expansion of the bellows 165 so that subsequent expansion thereof must take place in an upward direction, as viewed in Fig. 3. Such subsequent expansion of the bellows 165 produces upward movement of the secondary reservoir 166 and the mixing valve 135 to reduce the rate of flow of hot water into the primary mixing chamber 46 and to permit flow of cold water thereinto to begin. The expansion of the bellows 165 continues until a condition of temperature equilibrium has been attained, whereupon the thermostatic means 50 regulates the position of the mixing valve 135 in such a manner as to maintain the temperature of the initial mixture entering the primary mixing chamber 46 substantially constant as will be apparent to those skilled in the art.

It will be noted that the temperature at which the initial mixture is maintained may be varied by varying the position of the adjusting rod 174 to vary the amount which the bellows 165 must expand before the stop member 170 engages the upper end of the adjusting rod. As will readily be apparent from Fig. 3 of the drawings, the position of the adjusting rod may be varied by loosening the nut 176 and threading the rod into or out of the bore 175 in the insert member 137. The adjusting rod 174 may then be locked in the desired position by tightening the nut 176.

As previously discussed, the thermostatic means 50 is preferably set semi-permanently to maintain the temperature of the initial mixture in the primary mixing chamber 46 substantially constant at a predetermined, maximum value, which maximum is preferably equal to the temperature of the hottest water that the average person can withstand reasonably comfortably. As best shown in Fig. 3, the thermostat adjusting means 51 is normally inaccessible so that the maximum temperature setting of the thermostatic means 50 cannot be tampered with by persons normally using the regulator 15. It will be noted that the adjusting means 51 is rendered normally inaccessible by locating it behind the panel 31 which covers the front of the regulator 15. However, if it is necessary to adjust the temperature setting of the thermostatic means 50 for any reason, the panel 31 may be removed to permit access to the adjusting means 51 by service personnel.

It will be noted that since the thermostatic means 50 includes both the bellows 165 and the secondary reservoir 166, a much larger volume of the temperature responsive operating fluid may be employed than would otherwise be possible. Consequently, any fluctuations in the maximum temperature of the initial mixture which result from fluctuations in the temperatures in the hot and cold water, or from other causes, produce relatively large changes in the total volume of the operating fluid. Since the volume of the secondary reservoir 166 is fixed, such changes in the volume of the operating fluid must be compensated for by expansion or contraction of the bellows 165, depending upon whether the volume changes result from temperature increases or temperature decreases. Consequently, if the volume of the bellows 165 is small as compared to that of the secondary reservoir 166, which is preferably the case, a given change of the volume of the operating fluid produces a relatively large change in the length of the bellows. Thus, the construction illustrated is, in effect, an amplifying system which converts a relatively small change in the temperature of the initial mixture into a relatively large change in the length of the bellows 165 so that the response to even small fluctuations in the temperature of the initial mixture is quite sensitive. Consequently, if the temperature of the initial mixture should deviate from the predetermined maximum value for any reason, the bellows 165 produces a relatively great movement of the mixing valve 135 to compensate for such a deviation almost instantaneously.

Since the thermostatic means 50 is preferably adapted to maintain the temperature of the initial mixture substantially constant at a specified maximum value, such as 115° F., for example, the thermostatic means need operate through only a small range of temperatures extending from say 5° F., for example, below the specified maximum value to a temperature of say 2° F., for example, above the specified maximum. Preferably, all of the expansion and contraction of the bellows 165 takes place within this range. Consequently, the volume of the bellows 165 may be made very small as compared to the total volume of operating fluid. In order to permit the use of such a small bellows 165, the bellows and the secondary reservoir 166 are preferably filled initially by compressing or collapsing the bellows to its minimum length, as determined by engagement of the stop member 170 with the head member 168, and by subsequently filling the bellows and the secondary reservoir with operating fluid at a temperature corresponding to the lower limit of the desired range of action. When the system is filled with operating fluid in this manner, it will be apparent that the bellows 165 will not begin to expand until the temperature of the operating fluid reaches the temperature at which the system was filled, which temperature may, for example, be 5° F. below the specified maximum temperature of the initial mixture as previously mentioned. Thus, the bellows 165 will expand from its minimum length to its maximum length for a change in the temperature of the operating fluid of say 7° F., for example, so that even small deviations in the temperature of the initial mixture from the specified maximum value will produce relatively large displacements of the mixing valve 135 to compensate for such deviations. Consequently, by filling the bellows 165 and the secondary reservoir 166 in the manner described, an extremely accurate and sensitive response to fluctuations in the temperature of the initial mixture results.

Although various fluids which expand and contract with changes in temperature, such as ether, acetone, etc., may be used in the bellows 165 and secondary reservoir 166, I prefer to employ isopropyl alcohol because of its relatively high coefficient of expansion and because of its relatively high boiling point, the latter property being particularly important since it insures that the operating fluid will remain in its liquid state at the temperatures at which the thermostatic means 50 is required to operate.

Referring now to Figs. 4 and 8 of the drawings, after the initial mixture at the maximum temperature has flowed from the primary mixing valve means 49 past the thermostatic means 50, it leaves the primary mixing chamber 46 through the intermediate passage 54 and enters the secondary mixing chamber or zone 55. Simultaneously, cold water may enter the secondary mixing chamber 55 through the auxiliary inlet passage 56 to mingle with the initial mixture entering this mixing chamber, thereby producing a final mixture of a temperature intermediate the temperature of the cold water and the specified maximum temperature of the initial mixture. The relative rates of flow of the initial mixture through the intermediate passage 54 and of the cold water through the auxiliary inlet passage 56 are controlled manually by the secondary mixing valve means 57 to obtain the desired final mixture temperature. As will be discussed in more detail hereinafter, the secondary mixing valve means 57 is adapted to vary the rates of flow of the initial mixture and of the cold water from zero to a maximum so that final mixture temperature may be varied from the temperature of the cold water to the desired maximum temperature of the initial mixture.

It will be apparent that since the temperature of the cold water will normally be constant for all practical purposes, and since the temperature of the initial mixture is maintained substantially constant at its maximum value by the inlet control means 48, the temperature of the final mixture produced in the secondary mixing chamber 55 will also be substantially constant for a given setting of the secondary mixing valve means 57. It will also be apparent that since the temperature of the final mixture may be varied as desired by varying the relative rates of flow of the initial mixture and of the cold water into the secondary mixing chamber 55 manually, changes in the temperature of the final mixture do not affect the thermostatic means 50 in any way. Thus, the only function required of the thermostatic means 50 is to maintain the temperature of the initial mixture at the maximum value by compensating for changes in the temperature of the hot water entering the regulator 15. Consequently, the thermostatic means 50 is capable of controlling the temperature of the initial mixture far more accurately than would be the case if the thermostatic means were required to readjust itself each time a different temperature is selected by the person using the regulator.

Moreover, since the temperatures of the initial mixture and of the cold water entering the secondary mixing chamber 55 are substantially constant, it will be apparent that a substantial portion of the mass of the structure of the regulator 15 will operate at substantially constant temperatures regardless of changes in the final mixture setting. Consequently, since a large portion of the mass of the regulator 15 operates under conditions of temperature equilibrium, the temperature of the final mixture will respond to changes in the final mixture temperatures setting very rapidly because of the fact that it is not necessary to change the temperature of the entire mass of the structure of the regulator each time the temperature setting is changed, which is another important feature of the invention.

Considering the manner in which the temperature of the final mixture is controlled in more detail, the manually operable mixing valve means 57 includes a selector valve 210 which is reciprocable in a bore 211 in the body of the regulator 15 as best shown in Figs. 4 and 9. The intermediate passage 54 for the initial mixture leaving the primary mixing chamber 46 terminates in an annular portion 212 which encircles the bore 211, and the auxiliary inlet passage 56 for the cold water entering the secondary mixing chamber 55 terminates in a similar annular portion 213, the annular portions 212 and 213 being separated by a wall 214 through which the bore 211 extends to receive the selector valve 210. The selector valve 210 is generally cup-shaped and is provided with a plurality of openings 215 in the base wall thereof through which the cold water may flow to mingle with the initial mixture as will be discussed in more detail hereinafter, only one of these openings being shown in Fig. 9. The selector valve 210 is movable through a range of operating positions such that any desired relative rates of flow of the initial mixture and of the cold water into the secondary mixing chamber 55 may be obtained to produce any desired final mixture temperature ranging from the temperature of the cold water to the temperature of the initial mixture. As best shown in Fig. 4, at one end of its travel the selector valve 210 is adapted to engage a cylindrical seat 218 to prevent flow of the initial mixture from the annular portion 212 of the intermediate passage 54 into the secondary mixing chamber 55. At the other end of its travel, the rim 219 of the cup-shaped selector valve 210 is adapted to seat against an insert member 220 in the bore 211 to prevent flow of cold water from the annular portion 213 of the auxiliary inlet passage 56 into the secondary mixing chamber 55. However, when the selector valve is in an intermediate position, both the initial mixture and the cold water may flow into the secondary mixing chamber.

Such movement of the selector valve 210 in the bore 211 is obtained by rotation of a stem member 222 having a head 223 which is threaded in a counterbore 224 in the insert member 220, the member 222 being provided with a stem 225 which extends through a counterbore 226 and a bore 227 in the insert member. The selector valve 210 is threaded on the end of the stem 225 so as to be movable therewith. The threaded connection between the head 223 on the stem member 222 and the insert member 220 is preferably such that the selector valve 210 will be moved through its full range of travel in less than one revolution of the stem member as will be discussed in more detail hereinafter.

The stem member 222 is sealed with respect to the insert 220 by a sealing ring 230 disposed in a groove in the stem 225, and is further sealed with respect thereto by packing 232, the packing being urged into fluid-tight engagement with the stem member and the insert member by a spring 233 which is retained by a snap ring 234, or the like. It will be noted that the packing 232 keeps any water from coming in contact with the threaded connection between the insert member and the head 223 on the stem member 222 so as to prevent corrosion of such threaded connection. The insert member 220, which is preferably threaded into the bore 211 in the body of the regulator 15, is sealed with respect to the body of the regulator by an annular sealing element 235 disposed in a complementary recess in the body of the regulator, the insert member preferably being provided with an annular flange 236 thereon which seats against the body of the regulator and retains the sealing element 235 in its recess.

The stem member 222 is provided with a flattened projection 239 thereon which is slidably received in a complementary slot 240 in a hub member 241, the hub member having a tapered exterior surface and being press fitted into a complementary tapered bore 242 in a bushing 243. This bushing extends through a bore 244 in the panel 31 which covers the regulator 15, and is provided with an annular flange 245 thereon which extends into a counterbore 246 in the panel 31, the flange 245 being disposed between the flange 236 on the insert member 220 and a shoulder 247 formed at the junction of the bore 244 and the counterbore 246 in the panel 31. The distance between the flange 236 and the shoulder 247 is preferably such as to permit substantially no movement of the bushing 243 axially of the stem member 222 so that any axial movement of the stem member relative to the bushing during adjustment of the selector valve 210 merely results in sliding movement of the flattened projection 239 on the stem member in the complementary slot 240 therefor in the hub member 241. The temperature control knob 26 fits over the bushing 243 and is secured to the hub member 241 by a screw 248, or the like, relative rotation between the knob 26 and the bushing being prevented by a key 249.

As previously discussed, whenever the person taking a shower desires to change the temperature of the final mixture delivered to the shower head 22, it is merely necessary to rotate the temperature control knob 26 in the proper direction as indicated by the words "hot" and "cold" adjacent the arrows 35 and 36 on the front panel 31. Such rotation of the temperature control knob is transmitted to the stem member 222 through the slidable driving connection provided by the flattened projection 239 in the slot 240 so that no movement of the control knob axially of the selector valve bore 211 is required, any tendency for such movement to occur being prevented by engagement of the flange 245 on the bushing 243 with either the shoulder 247, or the flange 236 on the insert member 220. The rotary movement communicated to the stem 222 in this manner is converted into axial movement of the stem member so as to move the selector valve 210 from one to another of its operating positions, thus varying the relative rates of flow of the initial mixture and of cold water into the secondary mixing chamber 55 to vary the temperature of the final mixture in the manner previously described. Since the nature of the threaded connection between the head 223 on the stem member 222 and the insert member 220 is such that less than one revolution of the stem member moves the selector valve 210 throughout its entire range of operating positions as previously mentioned, it will be apparent that there will be no overlapping of the graduations on the annular flange 28 of the temperature control knob 26. Moreover, such a threaded connection between the stem member 222 and the insert member 220 requires only a relatively small rotational displacement of the control knob 26 for a given change in the temperature of the final mixture so that such a change may be made rapidly by the person taking a shower.

It will thus be apparent that by manipulating the temperature control knob 26, the person taking a shower may obtain a final mixture which may range in temperature from that of the initial mixture down to the temperature of the cold water, depending upon the position of the selector valve 210 relative to the cylindrical seat 218 and the insert member 220. If the selector valve 210 engages the cylindrical seat 218, the temperature of the final mixture will be equal to that of the cold water since none of the initial mixture can enter the secondary mixing chamber 55, whereas if the selector valve is in a position such that the rim 219 thereof is seated on the insert member 220, the temperature of the final mixture will be equal to that at which the initial mixture is maintained by the thermostatic means 50 since no cold water can enter the secondary mixing chamber 55. Any intermediate positions of the selector valve 210 produce final mixture temperatures intermediate the temperature of the cold water and the temperature of the initial mixture.

As best shown in Figs. 4 and 9, the final mixture at the selected temperature flows from the secondary mixing chamber 55 past the flow interrupting means 60 and into the outlet passage 61 by way of a port 253 which connects the bore 211 for the selector valve 210 with the outlet passage 61. As previously discussed, the flow interrupting means 60 is adapted to terminate all flow through the regulator 15 in the event of any mal-functioning or failure of any component of the regulator which would result in a final mixture temperature in excess of a predetermined value, which value is preferably 2 or 3° F., for example, above the temperature at which the initial mixture is maintained by the thermostatic means 50. Thus, the flow interrupting means 60 serves as a safety device which eliminates any possibility of scalding the person taking a shower in the event of any failure of the thermostatic means 50, or any other component of the regulator, which would tend to result in the delivery of water of an excessively high temperature to the shower head 22.

As best shown in Fig. 9, the flow interrupting means 60 includes a safety valve member 254 having a sealing element 255 thereon which is adapted to seat against a shoulder 256 formed at the junction of the selector valve bore 211 and the outlet passage 61 to interrupt all flow through the regulator 15, the sealing element 255 being secured to the safety valve member by a screw 257, or the like. The safety valve member 254 is biased toward a closed position wherein the sealing element 255 is seated on the shoulder 256 by a spring 260, this spring being seated against the selector valve 210 and against a snap ring 261 which is disposed in an annular groove 262 in the peripheral wall of a bore 263 in the safety valve member. However, the safety valve member 254 is normally retained in an open position by fusible means 265 as will be described more in detail hereinafter, the fusible means being adapted to soften or melt at a desired temperature to release the safety valve member so that the spring 260 can urge it into its closed position to interrupt flow through the regulator 15, as will be described more fully hereinafter.

When the safety valve member 254 is in its open position, as shown in Fig. 9 of the drawings, the final mixture may flow from the secondary mixing chamber 55 into the outlet passage 61 through openings 266 in the safety valve member and through axially extending grooves 267 in the wall of the selector valve bore 211. As best shown in Fig. 7, the openings 266 in the safety valve member 254 extend laterally from the bore 263 therein and communicate with the grooves 267.

The fusible means 265 includes a fuse rod 268 which is slidably disposed in a bore 269 in the previously described stem member 222, the rod being provided with a tip 270 having a thin coating of metal thereon which is adapted to melt at the predetermined temperature at which operation of the flow interrupting means 60 is desired. The fusible coating on the tip 270 of the rod 268 is preferably only a few thousandths of an inch thick so that it will melt almost instantaneously if the final mixture temperature should exceed the predetermined value.

The safety valve member 254 is normally retained in its open position by the fusible coating on the tip 270 of the fuse rod 268, the safety valve member being provided with a retainer 273 which is disposed in the annular groove 262 and which is provided with a plurality of resilient fingers or retaining elements 274 that grip the fusible coating on the tip of the rod, as best shown in Figs. 4 and 7. The inner ends of the resilient fingers 274 are radiused and are spaced apart a sufficient distance so that they may move freely relative to the tip 270 of the rod 268 in the event that the fusible coating is melted so that the safety valve member 254 may move freely toward its closed position under the influence of the spring 260. However, the fingers 274 of the retainer 273 are sufficiently long to grip the fusible coating on the tip 270 in a positive manner to retain the safety valve 254 in its open position under normal conditions, the lengths of the fingers preferably being such that some deflection thereof is normally required in gripping the fusible coating, as shown in Fig. 9. The resilient fingers 274 also preferably grip the fusible coating on the tip 270 of the rod 268 with sufficient intensity to prevent rotation of the rod with the stem member 222 so as to prevent wear of the fusible coating during normal operation. By making the spacing between the inner ends of the fingers 274 sufficiently small, the fingers will be deflected as shown in Fig. 9 to insure a firm grip on the fusible coating. However, as previously discussed, the spacing between the ends of the resilient fingers 274 must not be so small as to cause binding when the fingers straighten upon melting of the fusible coating so that the safety valve member 254 may move into its closed position freely in the event that the temperature of the final mixture exceeds the temperature at which the fusible coating will melt.

As previously mentioned, the rod 268 is slidable in the bore 269 therefor in the stem member 222. As best shown in Fig. 9, the rod 268 is resiliently retained in the position required to hold the safety valve 254 in its open position by a spring 275, this spring being disposed in a counterbore 276 in the stem member 222 and being seated against a head 277 on the rod.

In the event that the temperature of the final mixture should reach a value sufficiently high to melt the fusible coating on the tip 270 of the rod 268, the resilient fingers 274 will disengage the tip of the rod so that the spring 260 urges the safety valve member 254 toward its closed position. It will be noted that when the safety valve member 254 is seated in its closed position, the pressure of the water in the selector valve bore 211 will retain the safety valve member in its closed position in a positive manner so that no further flow through the regulator can occur. Consequently, it is necessary to re-set the flow interrupting means 60 before the regulator 15 may be used again, it being, of course, necessary to repair the regulator in the event that the excessive final mixture temperature resulted from malfunctioning or failure of some component of the regulator, such as the thermostatic means 50, for example.

In re-setting the flow interrupting means 60, it is necessary to remove the fuse rod 268 and to replace it with a new rod, or to replace the fusible coating on the tip 270 of the old rod. The fuse rod 268 may be removed readily by removing the temperature control knob 26 and by removing a screw 278 which is threaded into the counterbore 276 in the stem member 222, this screw being provided with an annular groove for a sealing ring 279 to prevent leakage. The new fuse rod 268 may then be installed and the screw 278 and the control knob 26 replaced. In installing the new fuse rod 268 the spring 275 is depressed sufficiently to permit the coated tip 270 to enter the space between the inner ends of the resilient fingers 274, which then grip the fustible coating on the tip in the manner previously described.

The force applied to the fuse rod 268 by the spring 275 is preferably insufficient to overcome the pressure force exerted on the closed safety valve member 254 by the water, so that it is necessary to shut off the hot and cold water at the source before the new fuse rod is installed and the spring 275 will then restore the safety valve member to its open position. Thus, after any necessary repairs of the regulator 15 have been made and the new fuse rod 268 has been installed in the manner described, the regulator is again ready for operation.

As the final mixture at the temperature selected by the secondary mixing valve means 57 leaves the secondary mixing chamber 55, it enters the outlet passage 61 leading to the flow control means 62, the flow control means being adapted to maintain the rate of flow of the final mixture to the shower head 22 substantially constant at any value selected by the operator as will be discussed in more detail hereinafter. The flow control means 62 is more fully described in my aforesaid co-pending application Serial No. 707,677 and, per se, forms no part of the present invention.

As best shown in Fig. 4, the final mixture may enter a bore 281 in the body of the regulator 15 through a port 282, the flow control means 62 being disposed in this bore. The regulator 15 is provided with an annular passage 283 therein which encircles the bore 281 adjacent the port 282 and which communicates with a similar annular passage 284 through a connecting passage 285 which is shown schematically in Fig. 8. However, this connecting passage is located above the broken line 4—4 of Fig. 1 on which the sectional view of Fig. 4 is taken so that it is not shown in Fig. 4. The body of the regulator 15 is also provided with another annular passage 286 therein which encircles the bore 281 and which communicates with the outlet passage 63 leading to the by-pass and service outlets 64 and 65, the annular passages 284 and 286 being separated by a wall 287 through which the bore 281 extends to provide a cylindrical seat 288 for a component of the flow control means 62 as will be discussed in more detail hereinafter.

The flow control means 62 includes a valve member 291 which is slidable in the bore 281 and which is mounted on a rod 292, the valve member being secured to the rod by a screw 293 or the like. The screw 293 also retains a sealing washer 294 which is adapted to seat against a shoulder 295 formed at the junction of the bore 281 and the port 282 to prevent flow through the regulator 15. Leakage past the valve member 291 is prevented by a sealing ring 296 which is disposed in an annular groove in the valve member.

Slidably disposed in the bore 281 and encircling the rod 292 is a piston-like valve element 300 which is movable in response to pressure variations in the outlet passage 63 in such a manner as to maintain the rate of flow of the final mixture into the outlet passage 63 substantially constant at a predetermined value as will be discussed in more detail hereinafter. The valve element 300 is provided with an annular groove 301 therein which communicates with the annular passage 284, and is provided with a cylindrical portion 302 which is adapted to engage the cylindrical seat 288 to prevent flow of the final mixture from the annular passage 284 to the annular passage 286 leading to the outlet passage 63. The cylindrical portion 302 is provided with a spiral groove 303 therein which provides fluid communication between the annular passage 286 and a space 304 between the cylindrical portion of the valve element 300 and an insert member 305 so that the pressure of the final mixture in the annular passage 285 is applied to the end of the valve element 300. A spring 306 encircles the rod 292 between the valve member 291 and the valve element 300 and biases the valve element 300 toward a position such that the cylindrical portion 302 thereof disengages the cylindrical seat 288 to permit the final mixture to flow from the annular passage 284 to the annular passage 286 and thence to the outlet passage 63.

It will be apparent that if the rod 292 is moved downwardly, as viewed in Fig. 4, to unseat the sealing washer 294 on the valve member 291, the resulting movement of the valve member 291 is communicated to the valve element 300 through the spring 306 so that the cylindrical portion 302 of the valve element 300 disengages the cylindrical seat 288. Consequently, the final mixture may flow from the outlet passage 61 into the outlet passage 63 through the port 282, the annular passage 283, the connecting passage 285, the annular passage 284, and the annular passage 286. The pressure of the final mixture in the annular passage 286 is applied to the valve element 300 in such a manner as to move the valve element upwardly, as viewed in Fig. 4, by virtue of the fluid connection between the annular passage 286 and the space 304 which is provided by spiral groove 303 in the cylindrical portion 302 of the valve element 300. However, such upward movement of the valve element 300, as viewed in Fig. 4, is opposed by the spring 306 which tends to keep the cylindrical portion 302 of the valve element from engaging the cylindrical seat 288, whereby the valve element 300 seeks a position such that the forces applied thereto by the final mixture in the outlet passage 63 and by the spring 306 are equal. Consequently, if any pressure fluctuations in the outlet passage 61 occur, such pressure fluctuations result in movement of the cylindrical portion 302 of the valve element 300 toward or away from the cylindrical seat 288, depending upon whether the pressure fluctuations represent pressure increases or decreases, so as to vary the resistance to flow from the annular passage 284 to the annular passage 286 in such a manner as to maintain the pressure in the outlet passage 63, and consequently the rate of flow of the final mixture through the outlet passage 63, substantially constant at predetermined values.

It will be apparent that the rate of flow of the final mixture through the outlet passage 63 maintained by the valve element 300 depends upon the extent to which the spring 306 is compressed between the valve element and the valve member 291. Thus, by moving the valve member 291 upwardly, as viewed in Fig. 4, to decrease the extent of compression of the spring 306, the rate of flow of the final mixture will be decreased a corresponding amount, and, conversely, by moving the valve member 291 downwardly, as viewed in Fig. 4, to increase the extent of compression of the spring, the rate of flow of the final mixture will be increased since the pressure of the final mixture in the outlet passage 63 must increase to balance the increased spring force. Thus, when the valve member 291 is in a closed position such that the sealing washer 294 is seated against the shoulder 295, it prevents any flow through the regulator 15, and when the valve member 291 is moved toward an open position, it unseats the valve element 300 through the action of the spring 306 so that the spring controls the position of the valve element in such a manner as to maintain the rate of flow of the final mixture substantially constant at a value which depends upon the position of the valve member 291.

The valve member 291 is movable through its range of operating positions by axial movement of the rod 292 in the bore 281, the insert member 305 being provided with a bore 309 therein through which the rod extends. The rod 292 also extends through counterbores 310 and 311 in the insert member, and is provided with a head 312 thereon which is threaded into the counterbore 311 so that rotation of the rod results in axial movement thereof in the bore 281 to move the valve member 291 axially through its range of operating positions. Any leakage along the rod 292 which might result in corrosion of the threaded connection between the head 312 and the insert member 305 is prevented by packing 313 which is urged into fluid-tight engagement with the rod and the insert member by a spring 314 seated against a snap ring 315.

The rod 292 is operatively connected to the flow control knob 25 in much the same manner as the stem member 222 is operatively connected to the temperature control knob 26 so that a complete description of the connection between the rod 292 and the knob 25 is not necessary. It will be noted that the flow control knob 25 drives a bushing 318 into which a hub member 319 is press fitted, the knob being secured to the hub member by a screw 320 and being keyed to the bushing. The hub member 319 is provided with a slot 321 which slidably receives a flattened projection 322 on the rod 292 so that the flow control knob 25 may be rotated to produce axial movement of the rod without any axial movement of the control knob itself, any tendency of the flow control knob to move axially being prevented by a flange 323 on the bushing 318 which is disposed between a flange 324 on the insert member 305 and a shoulder 325 formed on the panel 31.

It will be noted that the piston-like valve element 300 must slide freely in the bore 281 to respond rapidly to small pressure fluctuations, thus necessitating a slight clearance between the valve element 300 and the peripheral wall of the bore. Any leakage past the valve element 300 into the space between it and the valve member 291 is permitted to escape through a passage 326 which leads to the by-pass outlet 64, the passage 326 being shown schematically in Fig. 8.

It will thus be apparent that by the simple expedient of rotating the flow control knob 25, the person taking a shower may obtain any desired rate of flow of the final mixture at the selected temperature to the shower head 22, limited, of course, to the maximum flow rate possible with the pressures available at the hot and cold water sources. As previously mentioned, the directions of rotation of the flow control knob 25 which are required to increase or decrease the flow rate are indicated by the arrows 33 and 34, respectively, on the panel 31. rotation of the knob to the end of its travel in the direction of the arrow 34 resulting in seating of the washer 294 on the valve member 291 against the shoulder 295 to terminate flow through the regulator 15. The lead of the threads in the threaded connection between the rod 292 and the insert member 305 is preferably such that approximately one and one-quarter revolutions of the flow control knob 25 result in movement of the valve member 291 from its closed position to its fully opened position and vice versa. although the lead of such threads may be varied as desired to require any number of revolutions of the flow control knob for a given movement of the valve member. I also prefer to provide a threaded connection such that approximately one-quarter of a revolution of the flow control knob 25 is required to move the valve 291 a sufficient distance from its closed position to unseat the valve element 300 so that the remainder of the rotational travel of the flow control knob may be utilized to control the flow rate of the final mixture although, as mentioned above, any desired threaded connection may be employed.

As previously mentioned, the final mixture flowing through the outlet passage 63 at the selected rate enters either the by-pass outlet 64 or the service outlet 65, the outlet control means 68 normally operating to deliver the final mixture to the by-pass outlet until the temperature of the initial mixture is equal to, or substantially equal to the specified maximum value, and thereafter operating to deliver the final mixture to the service outlet. However, as will be discussed in detail hereinafter, the outlet control means 68 operates independently of the temperature of the initial mixture to deliver the final mixture to the service outlet 65 when the temperature control knob 26 is set for cold water. The outlet control means 68 will now be considered in detail.

Referring particularly to Figs. 3 and 8, the outlet valve means 69, which forms part of the outlet control means 68. includes a control valve 330 which is axially slidable in a bore 331 in the body of the regulator 15. The bore 331 is closed at its upper end, as viewed in Fig. 3, by a head 332 which is retained by a snap ring 333 disposed in a groove in the body of the regulator 15, a fluid-tight seal between the head and the body of the regulator being provided by a sealing ring 334 located in a groove in the head. The bore 331 extends through a wall 335 located between the outlet passage 63 and the service outlet 65 to provide communication therebetween and to provide a cylindrical seat 336 for a component of the control valve 330 as will be discussed in more detail hereinafter. The body of the regulator 15 includes a partition 337 which separates the outlet passage 63 and the by-pass outlet 64, this partition having a circular opening 338 therethrough which is of smaller diameter than the bore 331 and which provides fluid communication between the outlet passage 63 and the by-pass outlet.

As best shown in Fig. 3, the control valve 330 includes a piston 340 which is slidable longitudinally of the bore 331, and includes a valve head 341 which is connected to the piston by a rod 342. the valve head being provided with a cylindrical surface 343 which is adapted to engage the cylindrical seat 336 to prevent flow of the final mixture from the outlet passage 63 to the service outlet 65 in one position of the control valve 330, and being provided with a tapered surface 344 which is adapted to engage the partition 337 to prevent flow of the final mixture from the outlet passage 63 to the by-pass outlet passage 64 through the circular opening 338 in another operating position of the control valve. A spring 345 encircles a stem 346 extending from the valve head 341 and is seated against the valve head. this spring being adapted to urge the control valve 330 upwardly, as viewed in Fig. 3. toward the position wherein the cylindrical surface 343 on the valve head engages the cylindrical seat 336 to prevent flow from the outlet passage 63 to the service outlet 65. The stem 346 extending from the valve head 341 is slidable in a bore 347 in the body of the regulator 15 and serves as a guide for the control valve 330.

It will be apparent that the spring 345 normally retains the control valve 330 in such a position that the valve head 341 prevents flow from the outlet passage 63 to the service outlet 65, whereby the final mixture flowing through the outlet passage 63 is delivered to the by-pass outlet 64. However, whenever the space between the piston 340 and the head 332 contains water under pressure, the pressure force applied to the piston overcomes the force applied by the spring 345 and moves the control valve 330 downwardly, as viewed in Fig. 3, so that the valve head 341 engages the partition 337 to prevent flow from the outlet passage 63 to the by-pass outlet 64, whereby the final mixture flowing through the outlet passage 63 enters the service outlet 65 and flows to the shower head 22. As will be discussed in more detail hereinafter, water under pressure is delivered to the space between the head 332 and the piston 340 through a passage 350 by the pilot valve means 70 whenever the temperature of the initial mixture in the primary mixing chamber 46 is up to, or substantially up to the specified maximum value, and is delivered thereto through the passage 350 by the actuating means 71 whenever the temperature control knob 26 is set for cold water. In order to permit the spring 345 to return the control valve 330 to the position wherein the cylindrical surface 343 on the valve head 341 engages the cylindrical seat 336 when no water under pressure is being delivered to the space between the head 332 and the piston 340, a slight clearance is provided between the piston and the wall of the bore 331 to permit leakage past the piston into the service outlet 65 so that the fluid pressure in this space may be dissipated.

Referring particularly to Figs. 3 and 10 of the drawings, the pilot valve means 70 is disposed in a bore 351 in the body of the regulator 15 which communicates with the passage 350 leading to the space between the head 332 and the piston 340 on the control valve 330, the body of the regulator also being provided with a passage 352 therein which connects the annular passage 284 adjacent the flow control means 62 to the bore 351 as shown schematically in Fig. 8. An insert member 353 is threaded into the bore 351 and is provided with an annular groove 354 therein which communicates with the passage 350, the insert member being sealed with respect to the body of the regulator 15 by a sealing ring 355 which is disposed in an annular groove in the insert member so as to prevent fluid leakage between the passage 350 and the passage 352. Leakage past the insert member 353 to the exterior of the regulator 15 is prevented by a gasket 356 which is retained by a cap 357 threaded on the insert member.

The insert member 353 is provided with a bore 360 therein which communicates with the annular groove 354 in the insert member through a plurality of openings 361. The insert member 353 is also provided with a circular opening 362 therein which cooperates with the bore 360 to provide a shoulder 363, and which communicates with the passage 352 through a space 364 between the insert member and the inner end of the bore 351. A cup-shaped member 365 is disposed in the bore 360 in the insert member 353 and is retained therein by a snap ring 366, a pilot valve member 367 being slidable axially in the cup-shaped member. The pilot valve member 367 includes a tapered head 368 thereon which is adapted to seat on the shoulder 363 at the junction of the bore 360 and the circular opening 362, and which, when unseated, permits flow from the passage 352 to the passage 350 by way of the space 364, the circular opening 362, the bore 360, the openings 361, and the annular groove 354. The pilot valve member 367 is normally held in its closed position with the head 368 seated on the shoulder 363 by a spring 371 which is disposed in a bore 372 in the pilot valve member and which is seated against the inner end of the cup-shaped member 365. The pilot valve member 367 is also provided with a bleed passage 373 therein which permits water from the passage 352 to enter the bore 372 and the interior of the cup-shaped member 365 so as to balance the pilot valve member hydraulically. The pilot valve member 367 is also provided with a stem 375 thereon which extends through the opening 362 and the space 364 into the bore 196 and which terminates adjacent the cylindrical projection 195 on the head member 168 of the thermostatic means 50.

The operation of the pilot valve means 70, and the manner in which it controls the operation of the outlet valve means 69, will now be considered in more detail, it being assumed, for convenience, that the regulator 15 has not been in operation for some time so that the temperature of the initial mixture in the primary mixing chamber 46 will have fallen well below the predetermined, maximum value. Under such conditions, the bellows 165 of the thermostatic means 50 will be contracted sufficiently so that the cylindrical projection 195 on the head member 168 to which the bellows is attached will be disengaged from the stem 375 of the pilot valve member 367.

However, if the regulator 15 is again placed in operation by rotating the flow control knob 25 in the direction of the arrow 33 to actuate the flow control means 62, hot water from the source of supply will enter the regulator through the inlet line 18 to displace any water in the regulator which has cooled off in the interval during which the regulator was inoperative. Consequently, the temperature of the initial mixture in the primary mixing chamber 46 will rise and, as it approaches the predetermined, maximum value, the bellows 165 will expand to operate the primary mixing valve means 49 in the manner previously described so as to maintain the temperature of the initial mixture at the maximum value. Such expansion of the bellows 165 causes the projection 195 on the head member 168 to engage the stem 375 on the pilot valve member 367, thus unseating the pilot valve member so that water may flow from the passage 352 into the passage 350 leading to the outlet valve means 69. Consequently, the resulting pressure applied to the piston 340 of the control valve 330 causes the valve head 341 to assume a position such that the final mixture flows from the outlet passage 63 into the service outlet 65 instead of the by-pass outlet 64 as previously described.

It will thus be apparent that whenever the temperature of the initial mixture in the primary mixing chamber 46 falls appreciably below the maximum value for which the thermostatic means 50 is set, the pilot valve means 70 prevents the delivery of water under pressure to the outlet valve means 69 to operate same so that the final mixture is delivered to the by-pass outlet 64. However, as long as the temperature of the initial mixture is up to, or substantially up to the maximum value, the thermostatic means 50 actuates the pilot valve means 70 so that water under pressure is delivered to the outlet valve means 69, thereby routing the final mixture to the service outlet 65 instead of to the by-pass outlet 64. Thus, the regulator 15 delivers the final mixture to the by-pass outlet 64 until normal operating temperatures are attained and subsequently delivers it to the service outlet 65, thereby insuring that no water will be delivered to the shower head 22 unless it is at the temperature selected by the person taking a shower.

Upon completion of a shower, the operator may terminate flow of the final mixture to the shower head 22 by rotating the flow control knob 25 to the limit of its travel in the direction of the arrow 34 in the manner previously described. The initial mixture in the primary mixing chamber 46 will then begin to cool to cause the bellows 165 of the thermostatic means 50 to contract, thus permitting the spring 371 to seat the pilot valve member 367 to prevent further flow of water to the space between the piston 340 of the control valve 330 and the head 332 through the passage 350. It will be noted that since the passage 352 leading to the pilot valve means 70 is located downstream from the valve member 291 which terminates flow through the regulator 15, the pressure applied to the piston 340 of the control valve 330 at the instant the pilot valve member 367 seats will be equal to the pressure resulting from the static head of water trapped in the service line 21 above the regulator 15 by the valve head 341 on the control valve 330, this static head preferably being sufficient to prevent immediate movement of the control valve by the spring 345. However, since a slight clearance is provided between the piston 340 of the control valve 330 and the wall of the bore 331, any water trapped in the space between the piston 340 and the head 332 and in the passage 350 by seating of the pilot valve member 367 will leak past the piston 340 slowly so that the spring 345 will move the valve head 341 on the control valve 330 slowly from the position wherein it is seated on the partition 337 to the position wherein it engages the cylindrical seat 336. The rate at which water leaks past the piston 340 is preferably sufficiently small that all of the water trapped in the service line 22 above the control valve 330 will drain into the by-pass outlet 64 while the valve head 341 on the control valve is in an intermediate position and before it engages the cylindrical seat 336.

It will be apparent that if the water in the service line 21 leading to the shower head 22 were not permitted to drain into the by-pass outlet 64 in this manner, it would be trapped in the service line by the control valve 330 and would be discharged through the shower head onto the next person taking a shower. If a considerable interval of time elapsed between showers, the water entrapped in the service line 21 in this manner might be uncomfortably cold. Thus, by avoiding entrapment of water in the service line 21 in the manner described, it is impossible for any water to be delivered to the shower head 22 unless it is at the temperature selected by the person intending to take a shower, this being an important feature of the invention.

It will be noted that since the pilot valve means 70 does not actuate the outlet valve means 69 to divert water from the by-pass outlet 64 to the service outlet 65 until such time as the temperature of the initial mixture in the primary mixing chamber 46 is substantially up to the specified maximum value, a cold shower cannot be taken until a sufficient quantity of hot water has flowed through the regulator 15 and out the by-pass line 20 to attain normal operating temperatures. In order to avoid the waste of water and the delay which this would entail, I provide the aforementioned means 71 for actuating the outlet valve means 69 independently of the temperature of the initial mixture in the primary mixing chamber 46 when only a cold shower is desired. As will be discussed in more detail in the following paragraphs, the actuating means 71 is adapted to by-pass the pilot valve means 70 so as to deliver the water required to actuate the outlet valve means 69 directly thereto whenever the temperature control knob 26 is set for a cold shower, i. e., whenever the temperature control knob is rotated to the limit of its travel in the direction of the arrow 36.

Considering the actuating means 71 in more detail, the body of the regulator 15 is provided with a passage 380 therein which connects the passage 352 leading to the pilot valve means 70 with an annular groove 381 formed in the insert member 220 in the selector valve bore 211. The annular groove 381 communicates with another annular groove 382 in the insert member 220 through openings 383, the groove 382 being formed in the wall of the bore 227 in the insert member. The insert member 220 is provided with another annular groove 384 therein which is also formed in the wall of the bore 227, the annular groove 384 being connected to an annular groove 385 in the exterior of the insert member by openings 386. The annular groove 385 is connected to the passage 350 leading to the outlet valve means 69 by a passage 388 as best shown in Fig. 8. Leakage between the annular grooves 381 and 385 is prevented by a sealing ring 389 which is located in a complementary groove in the insert member 220, and leakage between the annular groove 385 and the auxiliary inlet passage 56 is prevented by a similarly located sealing ring 390.

It will be noted that when the selector valve 210 is in an intermediate position, fluid communication between the annular grooves 382 and 384 is prevented by the stem member 222 which is disposed in the bore 227 in the insert member 220. However, the stem member 222 is provided with an annular groove 391 therein which connects the grooves 382 and 384 in the insert member 220 when the selector valve 210 is in a position such that substantially all of the water flowing into the secondary mixing chamber 55 is cold water from the auxiliary inlet passage 56. In other words, if the temperature control knob 26 is set for a final mixture temperature which is substantially equal to that of the cold water so as to obtain a cold shower, the groove 391 in the stem member 222 interconnects the annular grooves 382 and 384 in the insert member 220 so that water may flow from the passage 352 to the passage 350 by way of the passages 380 and 388 regardless of the position of the pilot valve 367.

Thus, whenever a cold, or substantially cold shower is desired, the pilot valve means 70 is by-passed so that the water required to operate the outlet valve means 69 is delivered directly thereto. Consequently, the person desiring a cold shower may, by rotating the temperature control knob toward the end of its travel in the direction of the arrow 36, obtain a flow of water at the desired temperature to the shower head 22 immediately without having to wait for the regulator 15 to warm up.

From the foregoing description of my temperature and flow regulator 15 it will be apparent that the device may be employed to deliver water to the shower head 22 at various selected flow rates and at various temperatures, the flow rates attainable ranging from zero up to a maximum value which is commensurate with the pressures available at the hot and cold water sources, and the temperatures attainable ranging from that of the cold water up to the maximum temperature for which the thermostatic means 50 is set. As previously discussed, the regulator 15 operates to maintain the rate of flow and the temperature of the water delivered to the shower head 22 substantially constant at the respective values selected by the operator.

The regulating device also eliminates any possibility of scalding the person taking a shower by avoiding delivery of any water of an excessively high temperature to the shower head 22. In the first place, the thermostatic means 50 normally operates to prevent any rise in the temperature of the initial mixture above the specified maximum value, which value is preferably the highest temperature that the average person can withstand with reasonable comfort, although it will be apparent that the thermostatic means 50 may be set for other temperature values if desired. However, if the thermostatic means 50 should fail to operate properly for any reason so that the regulator 15 would tend to deliver water at an excessively high temperature to the shower head 22, the flow interrupting means 60 responds almost immediately to prevent further flow through the regulator. Since the quantity of fusible metal incorporated in the flow interrupting means 60 is preferably very small so that it will melt rapidly in the event of an excessive water temperature, the flow interrupting means will operate to terminate flow through the regulator before any of the water at the excessive temperature can flow through the service line 21 to the shower head 22 so that it is impossible for any water at a dangerously high temperature to reach the shower head. It will also be noted that the pressure equalizing means 43 will operate to terminate the flow of hot water into the regulator 15 in the event of failure of the cold water supply so that the pressure equalizer serves as an additional means for preventing the delivery of any water at an excessively high temperature to the shower head 22 under such conditions.

Another feature of the invention which should be noted particularly resides in the concept of producing an initial mixture which is maintained constant at a maximum, usable value and of producing a final mixture of the desired temperature by manually mixing cold water of equal pressure with the initial mixture in accordance with the wishes of the particular individual taking a shower. This construction permits the thermostatic means 50 to be used to move the primary mixing valve means 49 throughout its entire range of travel in response to temperature changes of but a few degrees F., so that an extremely accurate and sensitive response to even minor temperature fluctuations is obtained. Moreover, since changes in the temperature of the final mixture delivered to the shower head 22 are made independently of the thermostatic means 50, the thermostatic means is not required to readjust itself each time the final mixture temperature is changed so that such changes are effected very rapidly. It will also be noted that this construction permits the major portion of the mass of the structure of the regulator 15 to operate under conditions of temperature equilibrium so that changes in the temperature of the final mixture may be obtained more rapidly, it being unnecessary to change the temperature of the structure of the entire regulator each time a change in the temperature of the final mixture is desired.

Although I have disclosed an exemplary embodiment of my invention and have described a specific application of this embodiment, it will be understood that I do not desire to be limited thereto since the particular embodiment disclosed is susceptible to other applications and since various changes, modifications and substitutions may be incorporated therein, all without departing from the spirit of the invention. Consequently, I hereby reserve the right to the protection afforded by the full scope of the appended claims.

I claim as my invention:

1. In a device for mixing fluids of different temperatures and for controlling the temperature and discharge of a mixture of the fluids, the combination of: housing means provided with inlet passages for the respective fluids and provided with by-pass and service outlets for the mixture; inlet control means associated with said inlet passages and including thermostatic means exposed to the mixture for controlling the relative rates of flow of the fluids through said inlet passages to maintain the temperature of the mixture substantially constant at a predetermined value; outlet control means actuable by said thermostatic means for delivering the mixture to said by-pass outlet until it is at a temperature differing from the predetermined value by a predetermined amount, and for then delivering the mixture to said service outlet; and manually operable means for mixing one of the fluids with the mixture of predetermined temperature at a point downstream from said thermostatic means so as to change the temperature of the mixture.

2. In a device for mixing fluids of different temperatures and for controlling the temperature and discharge of a mixture of the fluids, the combination of: housing means provided with a mixing chamber and having inlet passages for the respective fluids which communicate with said mixing chamber, said housing means being provided with an outlet passage which communicates with said mixing chamber and which includes branching by-pass and service outlets for the mixture, and said housing means being provided with an auxiliary inlet passage for one of the fluids which communicates with said outlet passage; mixing valve means for regulating flow of the fluids through said inlet passages into said mixing chamber; thermostatic means exposed to the mixture in said mixing chamber for regulating the operation of said mixing valve means to maintain the temperature of the mixture in said mixing chamber substantially constant at a predetermined value; outlet control means normally actuable by said thermostatic means for delivering the mixture to said by-pass outlet until the mixture is at a temperature differing from the predetermined value by a predetermined amount and for then delivering the mixture to said service outlet; manually operable valve means for varying the relative rates of flow of the mixture of predetermined temperature through said outlet passage and of said one fluid through said auxiliary inlet passage to change the temperature of the mixture in said outlet passage from the predetermined value, said manually operable valve means being movable through a range of operating positions and in one of its operating positions being adapted to reduce the rate of flow of the mixture through said outlet passage substantially to zero; and means operable when said manually operable valve means is in said one position for opening said service outlet and closing said by-pass outlet independently of said thermostatic means.

3. In a device for mixing fluids of different temperatures and for controlling the temperature and discharge of a mixture of the fluids, the combination of: housing means provided with inlet passages for the fluids and an outlet passage for the mixture and having a mixing zone therein with which said passages communicate, said outlet passage including separate by-pass and service outlets located downstream from said mixing zone, said housing means being provided with an auxiliary inlet passage which communicates with said outlet passage intermediate said mixing zone and said service outlet; inlet control means responsive to the temperature of the mixture in said mixing zone for admitting the fluids into said mixing zone from said inlet passages in such proportions as to maintain the temperature of the mixture in said mixing zone substantially constant at a predetermined value; outlet valve means for opening and closing said by-pass and service outlets, said outlet valve means normally being in a first position wherein said by-pass outlet is open and said service outlet is closed and being movable into a second position wherein said by-pass outlet is closed and said service outlet is open; actuating means responsive to the temperature of the mixture in said mixing zone for actuating said outlet valve means to move said outlet valve means to said second position when the temperature of the mixture in said mixing zone differs from the predetermined temperature by a predetermined amount, whereby the mixture is delivered to said by-pass outlet until the mixture is at the temperature differing from the control temperature by such predetermined amount, and is subsequently delivered to said service outlet; manually operable valve means for controlling the relative rates of flow of the mixture of predetermined temperature through said outlet passage and of said one fluid through said auxiliary inlet passage so as to change the temperature of the mixture from the predetermined value, said manually operable valve means being movable through a range of operating positions and, in one of its positions, being adapted to reduce the rate of flow of the mixture through said outlet passage substantially to zero; and means operable when said manually operable valve means is in said one position thereof for actuating said outlet valve means independently of said first-mentioned actuating means.

4. In a device for mixing first and second fluids and for controlling discharge thereof, the combination of: housing means provided with a mixing zone and having first and second inlet passages for the first and second fluids, respectively, which communicate with said mixing zone, said housing means being provided with by-pass and service outlets which communicate with said mixing zone; hydraulically operable outlet valve means for controlling flow through said by-pass and service outlets, said outlet valve means being movable by an operating fluid from a first position wherein said by-pass outlet is open and said service outlet is closed to a second position wherein said by-pass outlet is closed and said service outlet is open; means responsive to the temperature of the first fluid for supplying operating fluid to said outlet valve means when the temperature of the first fluid is substantially equal to a predetermined value; manually operable valve means movable through a range of operating positions for regulating the relative rates of flow of the first and second fluids into said mixing zone; and means operable when said manually operable valve means is in one of its positions for supplying operating fluid to said outlet valve means independently of said temperature responsive supplying means.

5. In a device for mixing first and second fluids of relatively higher and lower temperatures, respectively, and for controlling discharge thereof, the combination of: housing means provided with a mixing zone and having first and second inlet passages for the first and second fluids, respectively, which communicate with said mixing zone, said housing means being provided with by-pass and service outlets which communicate with said mixing zone; hydraulically operable outlet valve means for varying the extent of opening of said by-pass and service outlets and movable by an operating fluid from a first position wherein said by-pass outlet is open and said service outlet is closed to a second position wherein said by-pass outlet is closed and said service outlet is open; mixing valve means movable through a range of operating positions for varying the relative extents of opening of said first and second inlet passages, said first inlet passage being closed and said second inlet passage being open in one of said operating positions of said mixing valve means; and means operable when said mixing valve means is in said one operating position for supplying operating fluid to said outlet valve means so as to move said outlet valve means from said first position thereof to said second position thereof to close said by-pass outlet and open said service outlet.

6. In a device for mixing fluids of different temperatures and for controlling the temperature and discharge of a mixture of the fluids, the combination of: housing means provided with inlet passages for the respective fluids and provided with an outlet passage which includes by-pass and service outlets for the mixture; temperature responsive inlet control means associated with said inlet passages for controlling the relative rates of flow of the fluids through said inlet passages to maintain the temperature of the mixture substantially constant at a predetermined value; temperature responsive outlet control means for delivering the mixture flowing through said outlet passage to said by-pass outlet until the mixture is at a temperature differing from the predetermined value by a predetermined amount, and for then delivering the mixture to said service outlet; mixing valve means movable through a range of operating positions for mixing one of the fluids with the mixture of predetermined temperature at a point intermediate said inlet control means and said outlet control means; and means operable when said mixing valve means is in one of said operating positions for actuating said outlet control means to open said service outlet and close said by-pass outlet independently of the temperature of the mixture.

7. In a device for mixing fluids of different temperatures and for controlling the temperature of a mixture of the fluids, the combination of: housing means provided with inlet passages for the respective fluids and provided with an outlet passage for the mixture; inlet control means including thermostatic means exposed to the mixture for controlling the relative rates of flow of the fluids through said inlet passages so as to maintain the temperature of the mixture substantially constant at a predetermined value; valve means independent of said inlet control means and movable between open and closed positions for varying the extent of opening of said outlet passage; fuse means exposed to the mixture in said outlet passage for normally retaining said valve means in said open position, said fuse means being adapted to release said valve means in the event that the temperature of the mixture in said outlet passage exceeds the predetermined value by more than a predetermined amount; and means for biasing said valve means toward said closed position.

8. A device as set forth in claim 1 wherein said outlet control means includes hydraulically operable outlet valve means and includes pilot valve means actuatable by said thermostatic means for delivering an operating fluid to said outlet valve means to operate it.

9. A device as set forth in claim 8 including means operable when said manually operable means is in one of its operating positions for delivering an operating fluid to said outlet valve means to operate it independently of said pilot valve means.

WALTER L. VINSON.

REFERENCES CITED

The following references are of record in the file of this patent:

UNITED STATES PATENTS

| Number | Name | Date |
|---|---|---|
| 1,707,109 | Blair | Mar. 26, 1929 |
| 1,948,044 | Myers | Feb. 20, 1934 |
| 1,952,198 | Findley | Mar. 27, 1934 |
| 1,990,653 | Kollsman | Feb. 12, 1935 |
| 2,014,526 | Henning | Sept. 17, 1935 |
| 2,048,389 | Johnson | July 21, 1936 |
| 2,110,952 | Glenn | Mar. 15, 1938 |
| 2,171,992 | Rantine | Sept. 5, 1939 |
| 2,172,489 | Young | Sept. 12, 1939 |
| 2,271,644 | Jaynes | Feb. 3, 1942 |
| 2,296,266 | Breckenridge | Sept. 22, 1942 |
| 2,351,086 | Wells | June 13, 1944 |
| 2,364,659 | Ray | Dec. 12, 1944 |
| 2,366,236 | Clark | Jan. 2, 1945 |
| 2,415,994 | Curtis | Feb. 18, 1947 |
| 2,426,663 | Bevins | Sept. 2, 1947 |
| 2,433,466 | Littlejohn | Dec. 30, 1947 |